US008056013B2

(12) United States Patent
Atkins

(10) Patent No.: US 8,056,013 B2
(45) Date of Patent: Nov. 8, 2011

(54) METHOD FOR ARRANGING GRAPHIC ASSEMBLIES

(75) Inventor: Clayton Brian Atkins, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1733 days.

(21) Appl. No.: 11/128,543

(22) Filed: May 13, 2005

(65) Prior Publication Data

US 2006/0259857 A1    Nov. 16, 2006

(51) Int. Cl.
G06F 3/048    (2006.01)
(52) U.S. Cl. .................................. 715/788; 715/731
(58) Field of Classification Search ............. 715/517, 715/243, 730–732, 764, 783, 788, 790, 810, 715/838, 866
See application file for complete search history.

(56) References Cited

U.S. PATENT DOCUMENTS

| 5,136,686 A | 8/1992 | Kozar |
| 5,499,366 A | 3/1996 | Rosenberg et al. |
| 5,555,362 A | 9/1996 | Yamashita et al. |
| 5,712,995 A | 1/1998 | Cohn |
| 5,729,254 A | 3/1998 | Marks et al. |
| 5,760,786 A | 6/1998 | Marks et al. |
| 5,920,315 A | 7/1999 | Santos-Gomez |
| 5,956,738 A | 9/1999 | Shirakawa |
| 6,008,809 A | 12/1999 | Brooks |
| 6,301,586 B1 | 10/2001 | Yang et al. |
| 6,380,954 B1 | 4/2002 | Gunther |
| 6,415,306 B2 | 7/2002 | Seaman |
| 6,448,956 B1 | 9/2002 | Berman et al. |
| 6,563,602 B1 | 5/2003 | Uratani et al. |
| 6,636,648 B2 | 10/2003 | Loui et al. |
| 6,636,650 B1 | 10/2003 | Long et al. |
| 6,701,306 B1 | 3/2004 | Kronmiller et al. |
| 6,727,909 B1 | 4/2004 | Matsumura et al. |
| 6,771,292 B2 | 8/2004 | Sharp |
| 6,771,801 B1 | 8/2004 | Fisher et al. |
| 7,013,432 B2 | 3/2006 | Taylor et al. |
| 7,093,263 B1 | 8/2006 | Sexton et al. |
| 7,096,445 B1 | 8/2006 | Pucci et al. |
| 7,124,360 B1 | 10/2006 | Drenttel et al. |
| 7,148,990 B2 | 12/2006 | Atkins et al. |
| 7,149,968 B1 | 12/2006 | Ackerschewski et al. |
| 2002/0051208 A1 | 5/2002 | Venable |
| 2002/0070982 A1 | 6/2002 | Hill et al. |
| 2002/0095439 A1 | 7/2002 | Long et al. |

(Continued)

FOREIGN PATENT DOCUMENTS

EP    1186992 A2    3/2002

(Continued)

OTHER PUBLICATIONS

C. Brian Atkins, "Adaptive Photo Collection Page Layout," HP Labs, Palo Alto, CA 94304, 2004 Intl Conference, Oct. 24, 2004; <http://www.hpl.hp.com/research/isl/layout/>.

(Continued)

Primary Examiner — Weilun Lo
Assistant Examiner — Enrique Iturralde

(57) ABSTRACT

A method for arranging a set of graphic assemblies within an area includes establishing a candidate tree associated with the set of graphic assemblies; determining if the candidate tree is a feasible candidate tree; and in response to the candidate tree being a feasible candidate tree, arranging the set of graphic assemblies within the area in accordance with the candidate tree.

27 Claims, 20 Drawing Sheets

U.S. PATENT DOCUMENTS

| | | | |
|---|---|---|---|
| 2002/0122067 A1* | 9/2002 | Geigel et al. | 345/788 |
| 2003/0001879 A1 | 1/2003 | Lin et al. | |
| 2005/0071781 A1 | 3/2005 | Atkins | |
| 2005/0071783 A1 | 3/2005 | Atkins | |
| 2005/0240865 A1 | 10/2005 | Atkins et al. | |
| 2006/0010375 A1* | 1/2006 | Salesin et al. | 715/517 |
| 2006/0200758 A1 | 9/2006 | Atkins | |
| 2006/0279566 A1 | 12/2006 | Atkins | |

FOREIGN PATENT DOCUMENTS

| | | |
|---|---|---|
| EP | 1503336 A2 | 2/2005 |
| GB | 2378340 A | 2/2003 |
| JP | 01-191270 | 1/1989 |
| JP | 09-185728 | 7/1997 |
| JP | 10-293838 | 11/1998 |
| JP | 2002-288669 | 4/2002 |
| JP | 2002-142092 | 5/2002 |
| JP | 2003-101749 | 4/2003 |
| JP | 2003-274139 | 9/2003 |
| WO | WO 98/10356 A2 | 3/1998 |
| WO | WO 01/39019 A2 | 5/2001 |
| WO | WO02/37939 A2 | 5/2002 |
| WO | WO 02/084582 | 10/2002 |

OTHER PUBLICATIONS

Joe Geigel "Automatic Page Layout Using Genetic Algorithms for Electronic Albuming", Electronic Imaging 2001, Jan. 21-26, 2001.

http://www.math.utah.edu/ftp/pub/tex/bib.

D.F. Wong et al., "A new algorithm for floorplan design," Proc. Design Automation Conference, pp. 101-107, 1986.

Eldan Goldenberg, "Automatic layout of variable-content print data," MCs Dissertation, School of Cognitive & Computing Sciences, Univeristy of Sussex, Brighton, UK (2002).

* cited by examiner

→ GE1, GE2, GE3
→ GE1, GE4, GE5
→ GE1, GE6, GE7
↓ GE1
↓ GE2, GE4, GE6
↓ GE2, GE4, GE7
↓ GE2, GE5, GE6
↓ GE2, GE5, GE7
↓ GE3, GE4, GE7
↓ GE3, GE4, GE6
↓ GE3, GE5, GE6
↓ GE3, GE5, GE7

METHOD FOR ARRANGING GRAPHIC ASSEMBLIES

CROSS-REFERENCE TO RELATED APPLICATIONS

This application also relates to the following co-pending applications:

U.S. patent application Ser. No. 10/675,724, filed Sep. 30, 2003;
U.S. patent application Ser. No. 10/675,823, filed Sep. 30, 2003;
U.S. patent application Ser. No. 10/831,436, filed Apr. 23, 2004;
U.S. patent application Ser. No. 10/987,288, filed Nov. 12, 2004;
U.S. patent application Ser. No. 11/069,512, filed Mar. 1, 2005;
U.S. patent application Ser. No. 11/126,637, filed Apr. 15, 2005;
U.S. patent application Ser. No. 11/127,326, filed May 12, 2005;
U.S. patent application Ser. No. 11/151,167, filed Jun. 10, 2005;
U.S. patent application Ser. No. 11/190,436, filed Jul. 27, 2005;
U.S. patent application Ser. No. 11/769,671, filed Jun. 27, 2007; and
U.S. patent application Ser. No. 11/865,112, filed Oct. 1, 2007.

BACKGROUND

Personal digital content collections are growing at a phenomenal rate, with individuals compiling large collections of digital photographs and videos. Naturally, there is also a desire to display and share these photo and video collections by printing collections of images, creating digital "slide shows", and so on.

Computer software is currently available for arranging images, such as photographs, video frames, and blocks of text, on a page. Such software develops what are often called photo albums, comprising one or more pages with images selected by the user and arranged in various manners. A photo album page, as the term is used herein, refers to a page of fixed size having multiple images positioned thereon. A page may be a printed page, or a representation of a page, such as on a computer screen, television or projection screen.

Most conventional approaches to photo album layout rely on templates as a means for distributing images on the page. However, the number of possible form factors of printable content is increasing (e.g., panoramas, cropped photos, videos with varying numbers of keyframes). As this trend continues, it becomes difficult to provide sets of templates that adequately provide for all possible combinations of differently-shaped images and for all possible user preferences regarding the arrangement of images on the page. For example, on a single page, a user may desire to incorporate images which include individual photographs, blocks of text, and a sequence of keyframes from a video. The user may desire that one or more of the images have a fixed size, or that one or more of the images have a variable size, or both. The user may want to specify that adjacent images are separated by exactly a specified distance.

Currently available automated software lays out individual images independently, without any means for specifying that a particular subset of images should be positioned together in a cohesive group. This is unsatisfactory for many applications, such as for laying out keyframe images from a video. It is important that keyframes are arranged in a cohesive and ordered format (such as in rows and/or columns), because the keyframes include a temporal component that conveys action in the video.

Further, currently available automated software provides no means for the user to explicitly specify how far apart neighboring images should be. By providing explicit control over how images are spaced, layouts have a more polished, professional appearance and greater graphic design flexibility. For example, frames and corner decorations can be inserted around photographic images, and fixed-area "clip art" that reinforce a theme (e.g., a birthday, a holiday, a vacation, or so on), can be included without these embellishments overlapping or visually interfering with other images.

It is therefore desirable to provide a method for placing images on a page efficiently with a maximum variety of layout possibilities, while at the same time specifying that a particular subset of images should be positioned together in a cohesive group and/or specifying exact spacing between adjacent images.

SUMMARY

One embodiment of the present invention provides a method for arranging a set of graphic assemblies within an area. One implementation of the method comprise establishing a candidate tree associated with the set of graphic assemblies; determining if the candidate tree is a feasible candidate tree; and in response to the candidate tree being a feasible candidate tree, arranging the set of graphic assemblies within the area in accordance with the candidate tree.

DESCRIPTION

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense.

The invention is described herein with respect to graphic assemblies ("GA's") and graphic elements ("GE's"). A graphic element is a single image, such as a single photo, a single block of text, a piece of clip-art, a keyframe from a video, etc. A graphic assembly is a cohesive group or collection of one or more graphic elements. Graphic assemblies may comprise arbitrary subsets of graphic elements, or may comprise sequences of graphic elements. An example of a graphic assembly comprising a sequence of graphic elements is a collection of keyframes from a video, where each keyframe comprises a graphic element. A graphic assembly having more than one graphic element can be presented or arranged in more than one way. However, usually the number of possible presentations is limited. Sequences of graphic elements are typically arranged in rows and columns to preserve the sequence of the graphic elements. For example, a graphic assembly that includes a sequence of 6 keyframes has 4 possible presentations: a 2×3 array, a 3×2 array, a 1×6 array, and a 6×1 array. A graphic assembly having only one graphic element (such as a single photograph) is a "degenerate" graphic assembly with only one presentation.

Figure 1:
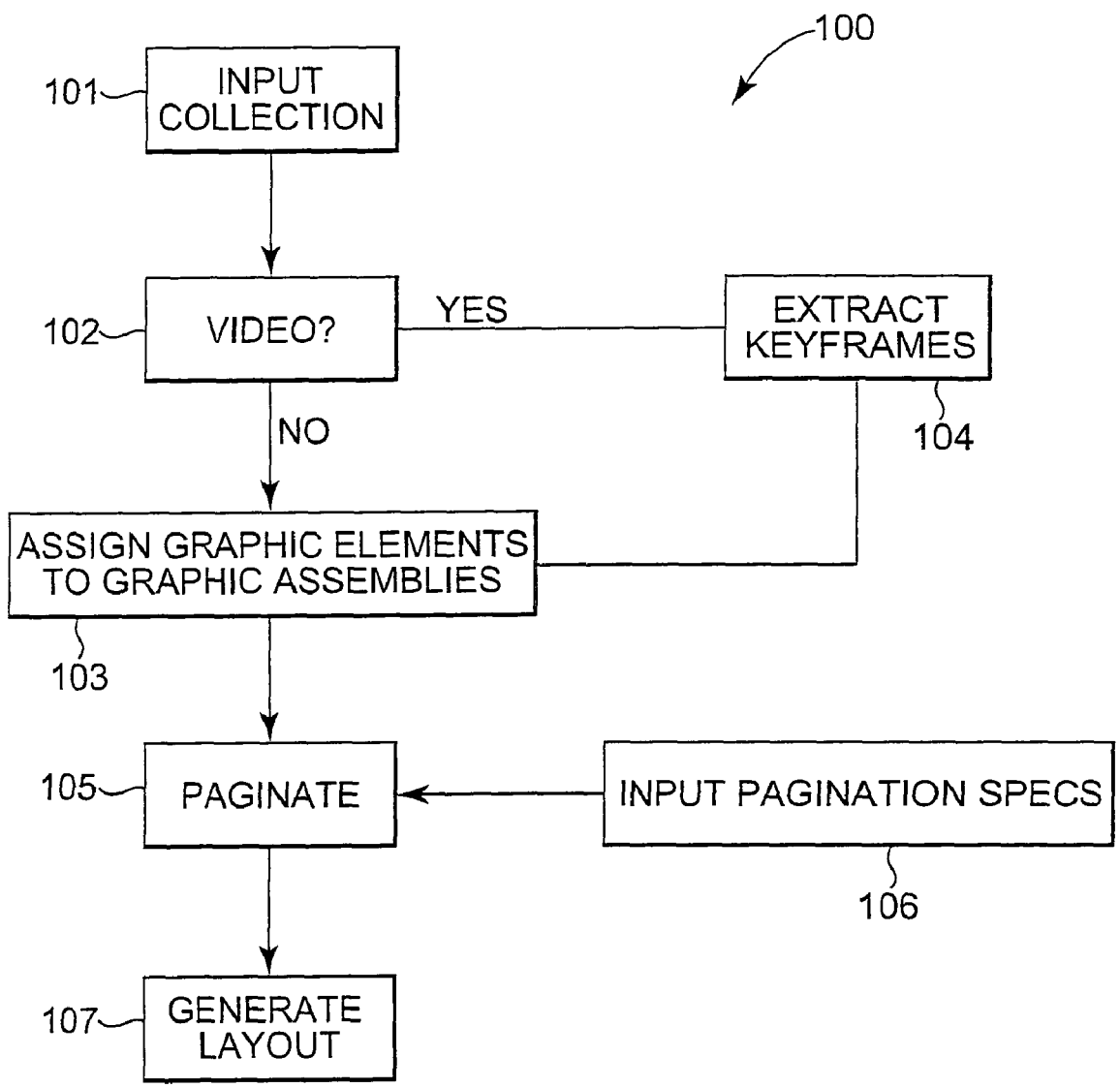
FIG. 1 is a flowchart illustrating general operation of a photo album creation system utilizing one embodiment of the invention.

An overview of one embodiment of a photo album creation system 100 according to the invention is illustrated in FIG. 1. The digital content collection to be used is specified by the user, and is input at step 101. The input collection may include photographs, videos, clip-art, blocks of text, or other images. The system may retrieve the input collection from various data sources, including a folder on the user's computer, a digital camera memory card, an on-line photo sharing website, or other similar data sources. The input collection may be in, for example, .pdf, .jpeg, or other suitable file format. In step 102, the system determines whether objects in the input collection are videos. Objects that are not videos are sent to step 103, where graphic elements of the input collection are assigned to graphic assemblies, with each graphic assembly having at least one graphic element. Objects in the input collection that are determined to be videos in step 102 are sent to step 104 where, for each video, a set of representative keyframes is extracted using any known method, and the keyframes are identified. The keyframes from each video are assigned to a single graphic assembly in step 103. The graphic assemblies are divided into pages at step 105, using pagination specifications input at step 106. Pagination can be accomplished using any known method. In one embodiment, the pagination specifications include precise spatial distribution requirements for the graphic assemblies. For example, the user or the system can require that adjacent graphic assemblies or graphic elements be separated by a specific, fixed distance. In one embodiment, the user explicitly specifies the graphic assemblies to appear on each page. In one embodiment, the user does not explicitly specify the graphic assemblies to appear on each page, and instead sets a range or maximum number of graphic assemblies per page. For example, the user may specify that each page should have no more than 5 graphic assemblies. In another embodiment, the system provides a range or maximum number of graphic assemblies per page, such as specifying between 3 and 7 graphic assemblies per page. Other pagination schemes may be used. Finally, at step 107 a layout of the graphic assemblies is established for each page, where a precise position and dimensions for each graphic assembly are determined.

Figure 2A:
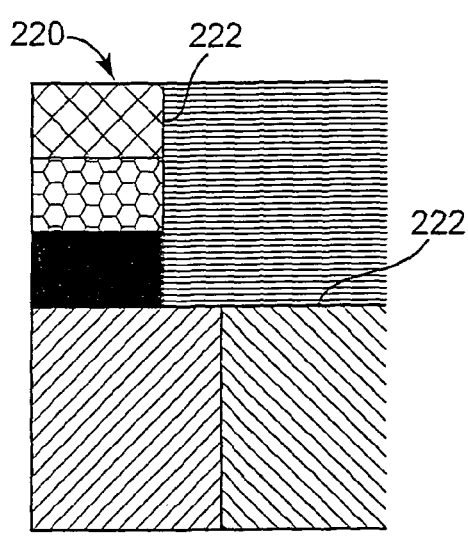
FIGS. 2A and 2B illustrate a slicing structure for predefined area (FIG. 2A) and its corresponding tree structure (FIG. 2B).
Figure 2B:
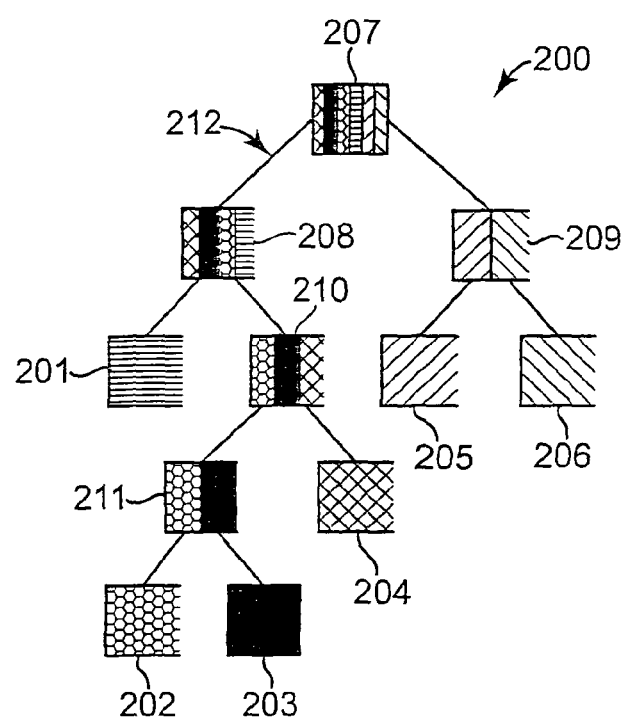

Referring to FIG. 2A, a page 220 is divided by one or more horizontal and vertical dividing lines 222 to form a plurality of sub-areas, where each sub-area is associated with a graphic assembly to be placed on the page. As the term is used herein, a page refers to an area of fixed size. A page may be a printed page, or a representation of a page, such as on a computer screen, television, projection screen, etc. The horizontal and vertical dividing lines 222 define a "slicing structure" for the page. When the associated graphic assemblies are placed in their respective sub-areas, a "layout" is created. The "slicing structure" and a corresponding layout can be represented using a binary tree 200 as illustrated in FIG. 2B, where components of the tree correspond to features of the page 220. The points in the tree that have branches 212 emanating from them are referred to as "internal nodes", while points in the tree that do not have branches emanating from them are referred to as "terminal nodes" or alternately, "leaves" of the tree 200. Internal nodes and terminal nodes may collectively or individually be referred to simply as "nodes". The page may be divided sequentially. Each internal node represents a horizontal or vertical dividing line or "cut" on the page 220; and each terminal node is associated with a sub-area and a corresponding graphic assembly. FIG. 2A shows page 220 divided into six sub-areas, representing five divisions made from the original page. FIG. 2B is a tree having six terminal nodes, or leaves 201, 202, 203, 204, 205, and 206, and five internal nodes, 207, 208, 209, 210, and 211. The node from which all other nodes emanate is referred to herein as the "root node." In FIG. 2B, internal node 207 is the root node. As used herein, a "subtree" refers to a portion of the tree emanating from a node. For example, internal node 210 and all nodes emanating therefrom (nodes 211, 202, 203 and 204) form a subtree. The present design builds different slicing structures depending on the desires of the user and the images presented, where each resultant slicing structure forms a layout, and multiple slicing structures and layouts may be prepared. The layout creation method of the present invention adds graphic assemblies to the layout one at a time, by refining the slicing structure. The first graphic assembly or GA is placed in the center of the page. The second graphic assembly is placed in one of two positions: either below, or beside, the first GA. The third GA is placed in one of 6 possible locations, and so on.

Figure 3:
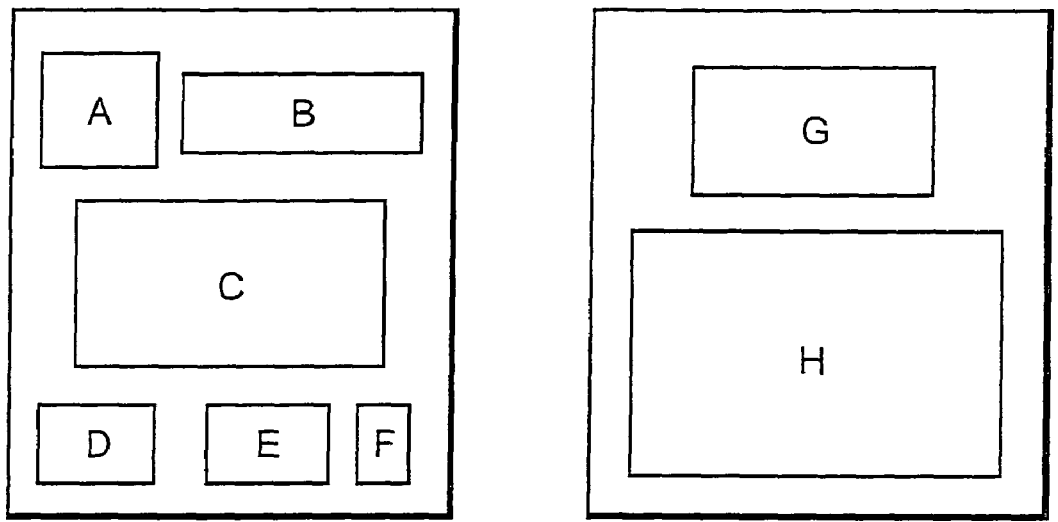
FIG. 3 illustrates the concept of strict area style layout of graphic assemblies in a predefined space.
Figure 4:
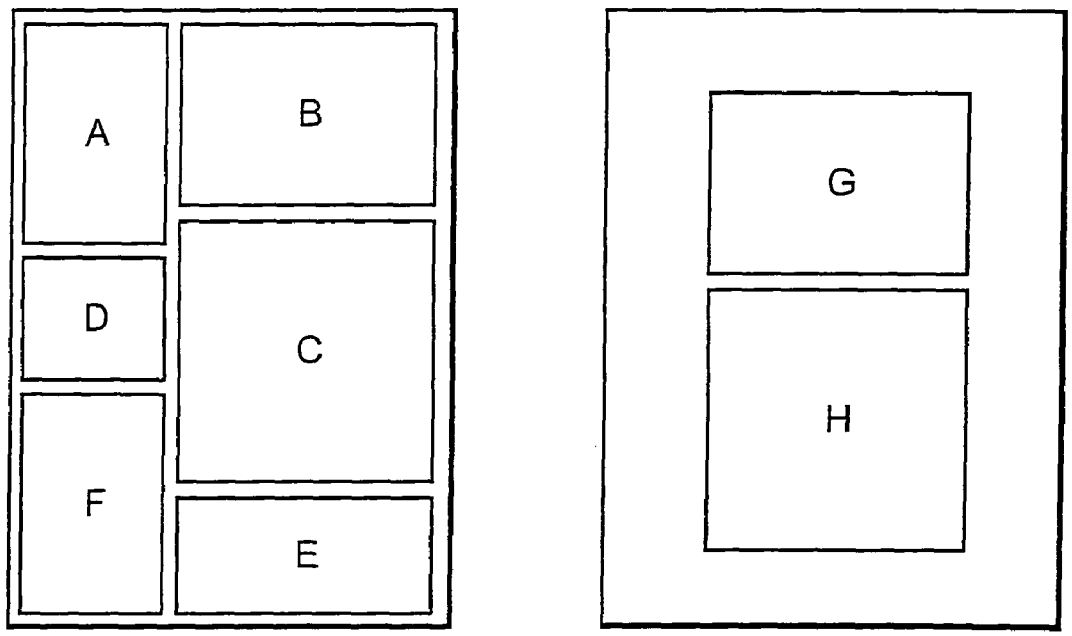
FIG. 4 illustrates the concept of brick style layout of graphic assemblies in a predefined space.

With respect to the invention, two specific styles of layouts are considered, namely "strict area" style layouts (illustrated in FIG. 3) and "brick" style layouts (illustrated in FIG. 4). In strict-area style, each graphic assembly is either fixed-area or variable-area, and each variable-area GA is assigned a relative area proportion. Fixed-area graphic assemblies are constrained to be of a predetermined area, while variable-area graphic assemblies are constrained in that the areas of GA's on the same page must respect associated relative area proportions. In brick style, each graphic assembly is required to be of variable area. In brick layout, graphic assemblies are arranged like bricks in a wall.

Referring to the strict area style of layout in FIG. 3, strict area generally refers to the fact that the areas of variable-area GA's on the same page strictly adhere to their relative area proportions. Each graphic assembly is located within a particular area or sub-area of the page. Conceptually, the page may be divided into multiple sub-areas, such as the left and right halves of the page, and the strict area layout style may center one image in the right half of the page and another image in the left half of the page.

When using the strict area style of layout, the user may provide a relative area proportion (RAP) value with each graphic assembly, used for purposes of dividing the page into areas. Use of a relative area proportion value enables the user to specify graphic assemblies have predetermined areas relative to other graphic assemblies on the same page. For example, a user may desire that a first graphic assembly be one-third the area of a second graphic assembly on the same page, and one-quarter the area of a third graphic assembly on the same page, where page areas are divided according to this preference and graphic assemblies centered in each area so divided. Relative area proportion is a numeric value, and in the foregoing example, the relative area proportions of the first, second and third graphic assemblies will be 1.0, 3.0, and 4.0, respectively. Relative area proportion is independent of the concept of aspect ratio, a subject discussed later.

Referring to the brick style of layout in FIG. 4, brick style is defined by the aspect that there is no unused space between adjacent graphic elements. That is, GA's fit together like bricks in a wall, with no unused space between them. Brick style can be achieved by constraining adjacent photos, or blocks of photos, to be the same height (if they are placed side-by-side) or the same width (if they are placed one above the other). For example, as can be seen in the right-hand side of FIG. 4, the width of photo G equals the width of photo H. Another example can be seen in the left-hand side of FIG. 4, where the block of photos A, D, F has the same height as the block of photos B, C, E.

Mathematically, the strict area style of operation indicates that on a given page, the areas of the graphic assemblies satisfy:

$$A_1/e_1 = A_2/e_2 = \ldots = A_N/e_N = \Lambda$$

where N is the number of graphic assemblies on the page, $A_i$ are the actual graphic assembly areas, and $e_i$ are the user specified relative graphic assembly area proportions. Strict area layout controls relative area proportions. If the user specifies that graphic assembly A is to be three times the size of graphic assembly B, the strict area layout style directs graphic assembly A to be three times the size of graphic assembly B irrespective of the exact positions of the two graphic assemblies, and irrespective of the page dimensions. Strict area layout may also be employed where the user specifies area constraints in a more casual way. For example, the user may specify that certain selected graphic assemblies should be larger than the other graphic assemblies on the same page, without specifying precise relative area proportions. In this example, the system making use of the present invention could translate the imprecise specification into a precise assignment of relative area proportions even though the user is not aware of it. So a user could specify three photos on the page to be "small" and three others to be "large," and the system would arbitrarily assign area proportions of between 1 and 3 to the "small" photos, and area proportions of between 4 and 6 to the "large" photos.

The aspect ratio of a graphic assembly is defined as the height of the graphic assembly divided by the width of the graphic assembly. Aspect ratios of graphic elements within graphic assemblies are regarded as fixed, reflecting the assumption that graphic elements, such as photographs, have already been framed or cropped to the satisfaction of the user and that it would be undesirable for the layout algorithm to crop graphic elements further. Thus, for graphic assemblies having only one graphic element, the aspect ratio of the graphic assembly is also regarded as fixed.

Each graphic assembly occupies an area on the page. The "area" as used herein is a fixed attribute of a rendered graphic assembly, which may be measured, for example, in units of square inches. The "relative area proportion," as described above, is a graphic assembly attribute used to compare areas of two graphic assembly on the same page. As such, "relative area proportion" and "area" are related but different concepts, with the former being purely relative in nature and the latter being absolute and measurable. For example, if the relative area proportions of two graphic assemblies differ by a factor of 4, so do the measurable areas of the two graphic assemblies in rendered output (e.g., on a printed page, on a representation of physical space, or on a computer display), regardless of the particular numerical values of their measurable areas.

Figure 5:
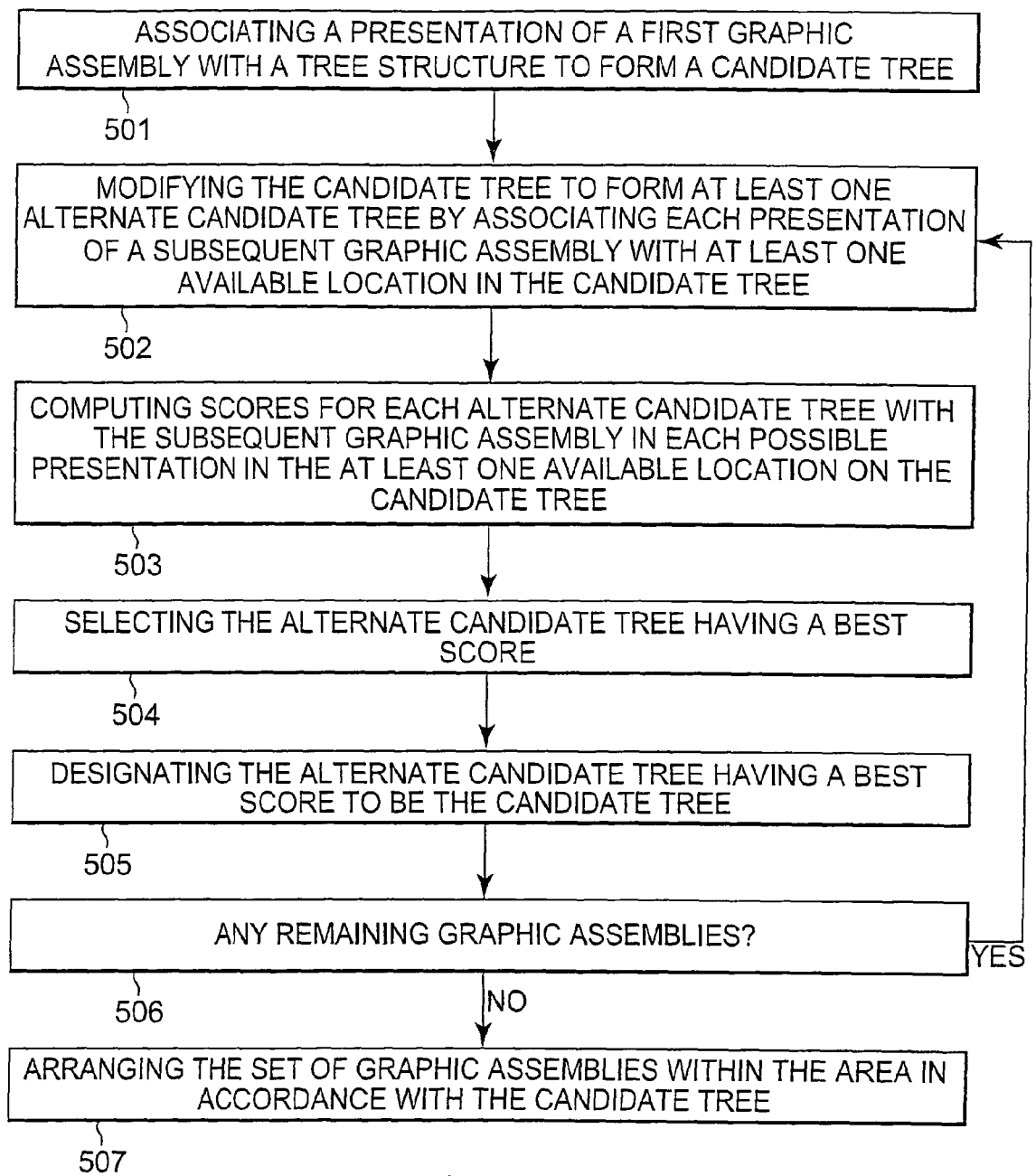
FIG. 5 is a flowchart of one embodiment of a method for arranging graphic assemblies in an area, according to the invention.

FIG. 5 shows one embodiment of the page layout method of the present invention, where at least one graphic assembly has more than one possible presentation. At step 501, a presentation of a first graphic assembly from a set of graphic assemblies is associated with a tree structure to form a candidate tree. At step 502, the candidate tree is modified to form at least one alternate candidate tree by associating each presentation of a subsequent graphic assembly from the set of graphic assemblies with at least one available location in the candidate tree. At step 503, scores are computed for each alternate candidate tree with the subsequent graphic assembly in each possible presentation in the at least one available location on the candidate tree. At step 504, the alternate candidate tree having a best score is selected, and at step 505 the selected alternate candidate tree is designated to be the candidate tree. At step 506, a determination is made whether there are any remaining graphic assemblies to be added to the layout. If there are additional graphic assemblies, the newly designated candidate tree is modified at step 502 and the process as repeated. When no additional graphic assemblies remain, the process progresses to step 507, and the set of graphic assemblies is arranged in accordance with the candidate tree.

According to the method, the system adds the specified graphic assemblies to the layout, one at a time. The layout is represented in the form of a binary tree structure such as the binary tree structure illustrated in FIG. 2B. Each graphic assembly is added to the layout by inserting a new terminal node corresponding to a presentation of the graphic assembly into the binary tree structure. The new terminal node may be inserted at any one of multiple locations within a layout tree structure. For graphic assemblies having more than one presentation, according to the method, the system may consider each possible presentation of the graphic assembly at any one of multiple locations within a layout tree structure. In one embodiment of the method, the system places and evaluates all presentations of the graphic assemblies in all available tree structure locations and selects the presentation and location yielding a layout having a best score.

Figure 6:
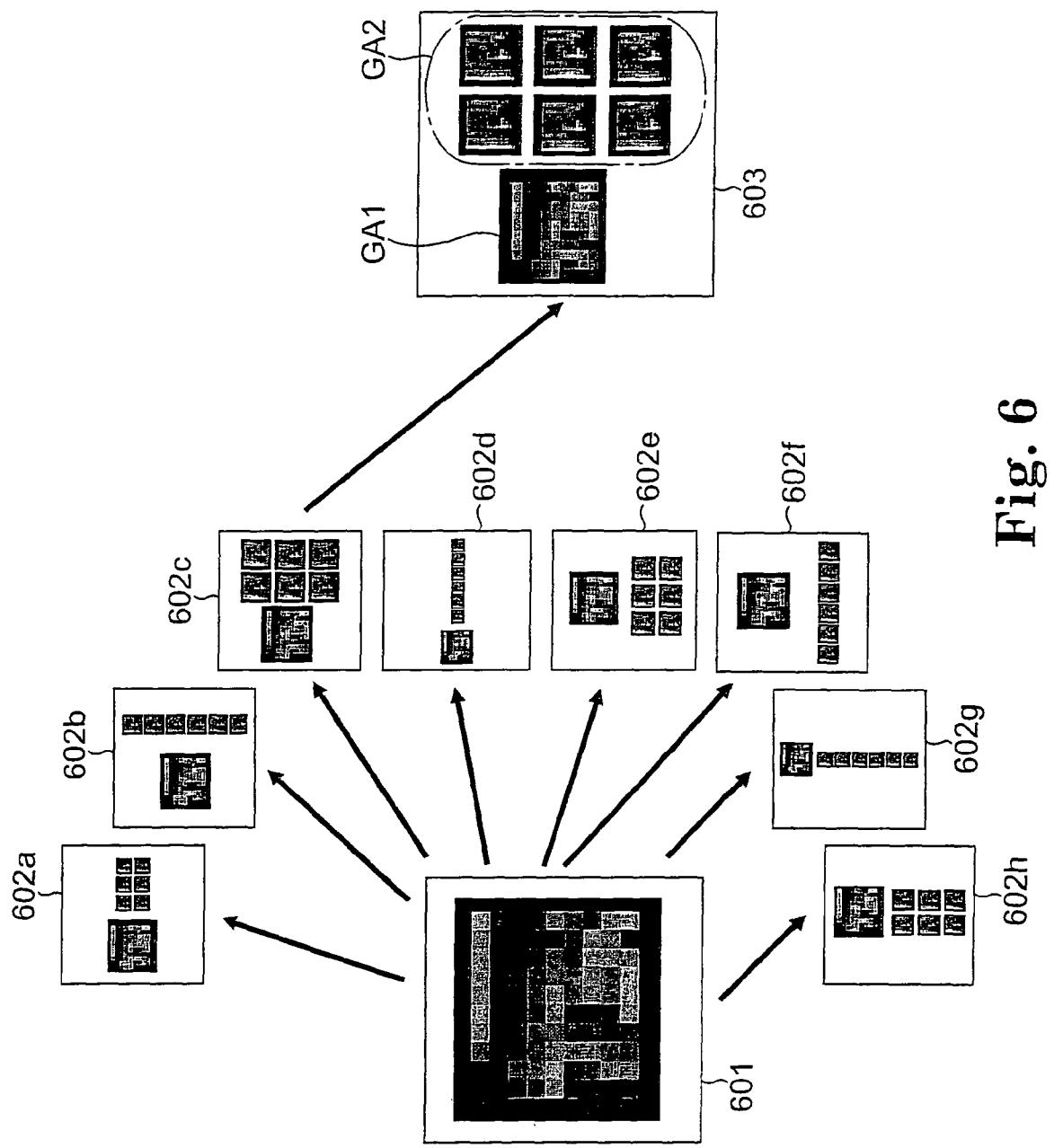
FIG. 6 illustrates the insertion of a graphic assembly having more than one possible presentation into a layout.

When inserting a graphic assembly into a location in the layout, each of the possible presentations of the graphic assembly is considered in turn. FIG. 6 shows a simple example, going from a page having a layout 601 with one graphic assembly (GA1) to a layout 603 with two graphic assemblies (GA1 and GA2). In FIG. 6, the first graphic assembly GA1 is a single graphic element having a single presentation, while the incoming graphic assembly GA2 is a sequence of 6 keyframes (e.g., graphic elements) with four allowable presentations of columns and rows (3×2, 1×6, 2×3, and 1×6). The incoming graphic assembly GA2 is considered at two possible locations in the layout (beside and below the first graphic assembly GA1). Within each location, the incoming graphic assembly GA2 is considered in each of its four possible presentations. The resultant eight possible layouts are shown as candidate layouts 602a, 602b, 602c, 602d, 602e, 602f, 602g, and 602h. The position and presentation that are selected are those that produce the layout having the best score. In one embodiment, the scoring function depends upon the layout style (strict area or brick) as described below. In the example of FIG. 6, the selected candidate layout 602c places the incoming graphic assembly GA2 in the first location (beside the first graphic assembly GA1) in its third presentation (2 columns by 3 rows).

Thus, to add a graphic assembly to the layout, a deterministic sequence of candidate layouts is evaluated, where each candidate layout is induced by a candidate slicing structure. Each candidate slicing structure is the slicing structure of the existing layout with one additional page division and one additional sub-area, which is associated with a presentation of the incoming graphic assembly. The candidate slicing structure having the best score is selected as the new layout that includes the new graphic assembly.

Figure 7A:
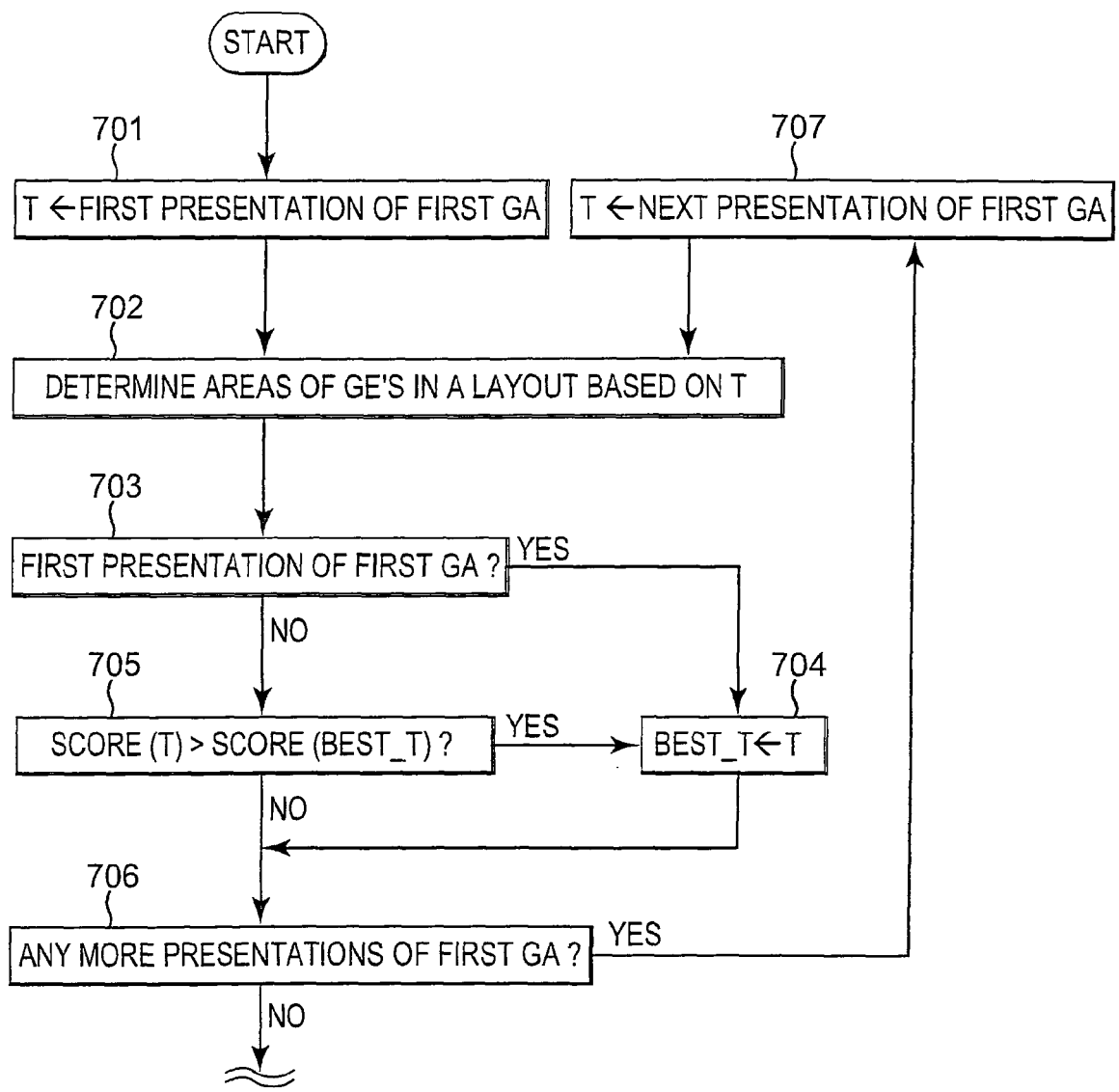
FIGS. 7A and 7B is a detailed flowchart illustrating one embodiment of a method for arranging graphic assemblies in an area according to the invention.
Figure 7B:
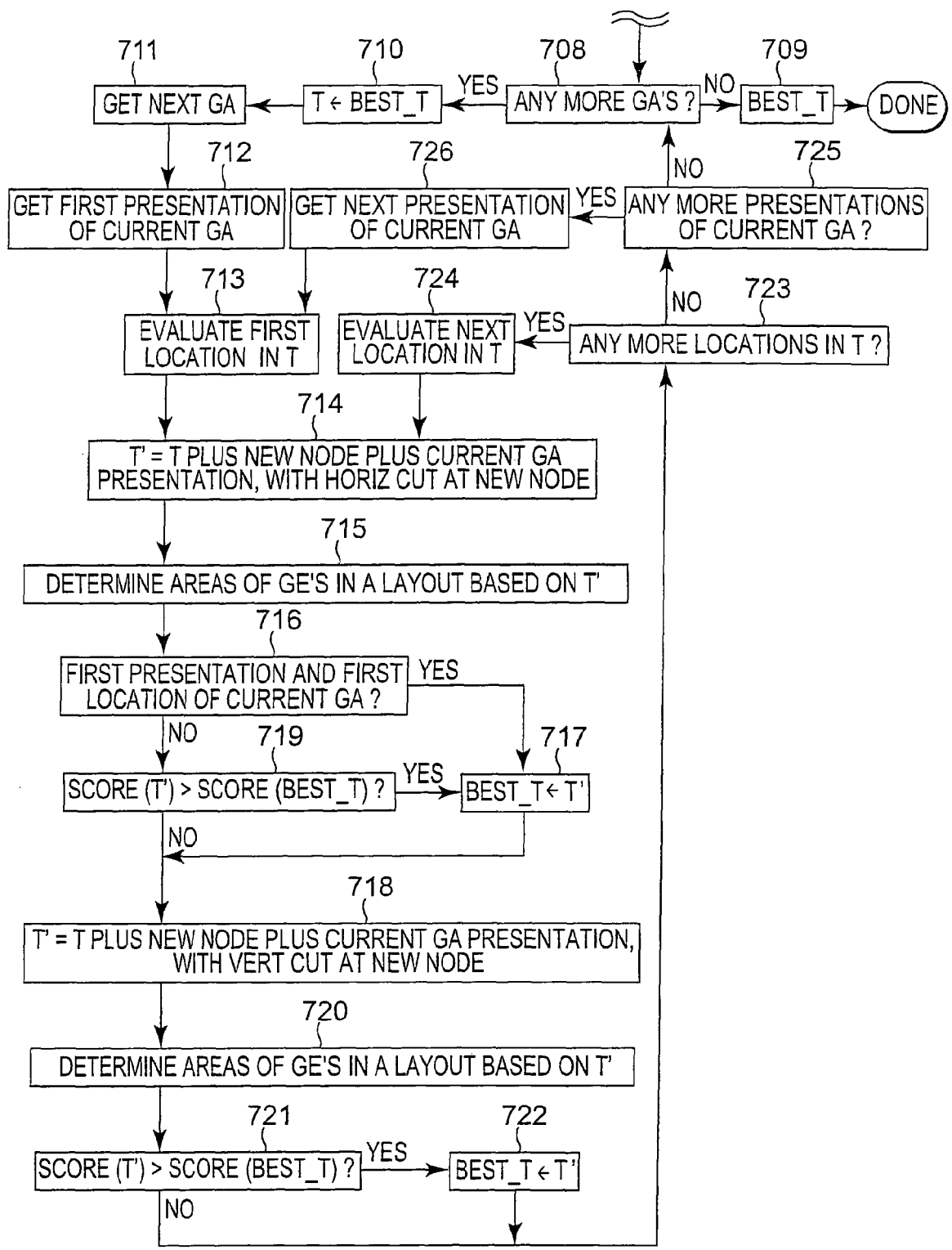

FIGS. 7A and 7B show one embodiment of the page layout method of the present invention, where at least one graphic assembly has more than one possible presentation. Block 701 initializes a candidate layout tree T with a first presentation of the first graphic assembly. Block 702, operating according to the flow chart of FIG. 10 discussed below, determines the areas of graphic elements in the graphic assembly in a layout based on candidate layout tree T. The process of determining the area of graphic elements may also be referred to as normalization. Block 703 evaluates whether this is the first presentation of the first graphic assembly. If this is the first presentation of the first graphic assembly, block 704 designates tree T as the best layout tree, best_T, and proceeds to block 706. If this is not the first presentation of the first graphic assembly, block 705 computes a score for the layout corresponding to the current tree, Score(T), and compares Score(T) to a score for the layout corresponding to the best tree, Score(best_T), where scoring may be performed in the manner described below. If Score(T) is better than Score (best_T), block 704 designates the current tree T as the new best_T, and proceeds to block 706. If Score(T) is not better than Score(best_T), the best tree designation is not changed, and the process proceeds to block 706. Block 706 evaluates whether any further presentations of the first graphic assembly are available. If more presentations of the first graphic assembly are available, block 707 retrieves the next presentation of the first graphic assembly to form an alternate candidate tree layout. Block 702 determines the areas of graphic elements in the alternate candidate layout tree T (having the next presentation of the first graphic assembly). If, at block 706, it is determined that there are no further presentations of the first graphic assembly, block 708 determines whether there are any more graphic assemblies to be added to the layout. If there are no more graphic assemblies to be added to the layout, the best_T determined using the first graphic assembly is the final output at block 709.

If block 708 determines there are additional graphic assemblies to be added to the layout, then block 710 designates the best layout tree, best_T, from the first graphic assembly as the new candidate tree T, and block 711 retrieves the next graphic assembly. Block 712 retrieves or determines the first presentation of the current graphic assembly, and block 713 evaluates the graphic assembly presentation at a first location in candidate tree T. The "location" as used herein may be either an internal node or an external node (i.e., leaf) of the candidate tree T. At block 714, an alternate candidate tree T' is created by adding a new node in the place of the location. One child of the new node is the subtree of candidate tree T whose root is the location in T. The other child of the new node is the current presentation of the graphic assembly currently being added to the layout. In alternate candidate tree T', a predetermined division, such as a horizontal or vertical division is assigned to the new node. Block 715 determines the areas of graphic elements in a layout based on alternate candidate tree T', in the manner described with respect to block 702. Block 716 determines if this is the first location and first presentation of the current graphic assembly. If this is the first location and first presentation of the current graphic assembly, block 717 designates alternate tree T' as the best layout tree, best_T, and proceeds to block 718. If this is not the first location and first presentation of the current graphic assembly, block 719 computes a score for the layout corresponding to the newly fashioned alternate tree T', Score(T'), and compares Score(T') with a score for the layout corresponding to the best layout tree, Score(best_T), where scoring may be performed in the manner described below. If Score(T') is better than Score (best_T), (indicating the alternate candidate tree T' is better than the candidate tree T), then block 717 designates T' as the best layout tree, best_T, and the operation moves to block 718. If Score(T') is not greater than Score(best_T), the best tree designation is not changed and operation progresses to the same block 718.

At block 718, another alternate layout tree T' is created by adding a new node in the place of the current location. One child of the new node is the subtree of T whose root is the location of T. The other child of the new node is the current presentation of the graphic assembly currently being added to the layout. In alternate tree T' of block 718, a predetermined division such as a horizontal or vertical division, is assigned to the new node. The division assigned at block 718 (e.g., a vertical division) is different than the division assigned at block 714 (e.g., a horizontal division). Block 720 determines the areas of graphic elements in a layout based on alternate tree T', in the manner described with respect to block 702 and 715. Block 721 determines a score for the layout corresponding to alternate candidate layout tree T', Score(T') and compares Score(T') with Score(best_T). Blocks 705, 719, 721 may use the same or different scoring method. If the Score(T') is greater than Score(best_T), block 722 designates alternate tree T' as the best layout tree, best_T, and operation progresses to block 723. If block 721 determines the score of T' is not greater than the score of best_T, operation progresses directly to block 723. Block 723 determines whether there are any additional locations available in the candidate tree T. If additional locations are available in candidate tree T, the next location is designated for evaluation at block 724, and blocks 714 through 723 are repeated using the same graphic assembly presentation. When block 723 determines no further locations are available in candidate tree T, operation progresses to block 725. Block 725 determines whether there are any additional presentations of the current graphic assembly available. If additional presentations of the graphic assembly are available, the process progresses to block 726 to retrieve the next presentation of the current graphic assembly. The next presentation of the current graphic assembly is then evaluated in each available location in T, following blocks 713 through 724. When block 725 determines there are no more presentations of the current graphic assembly, the operation progresses to block 708, to again determine if there are any additional graphic assemblies to be added to the layout. When block 708 determines there are no more graphic assemblies to be added to the layout, best_T is the final output at block 709.

Figure 8:
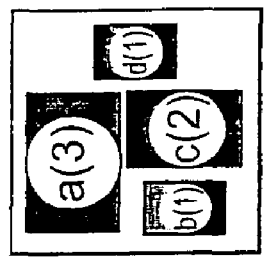
FIG. 8 illustrates successive insertions of graphic assemblies into an existing layout tree structure, and the corresponding layouts in one embodiment according to the invention.
Figure 8:
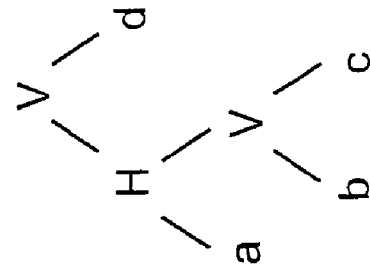
Figure 8:
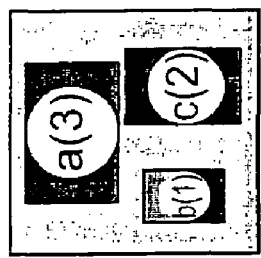
Figure 8:
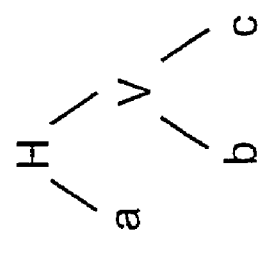
Figure 8:
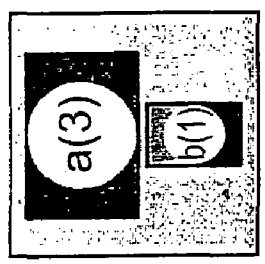
Figure 8:
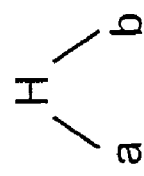
Figure 8:
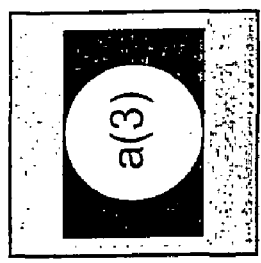

An example of successive insertions of graphic assemblies into an existing tree structure, and the corresponding layouts, are shown in FIG. 8. As each graphic assembly is added to the layout, the position and/or size of other graphic assemblies on the page are adjusted.

Figure 9A:
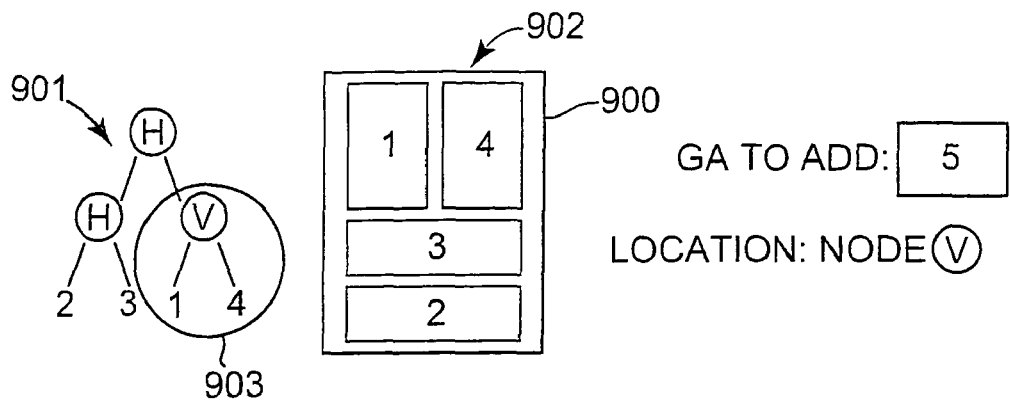
FIGS. 9A-9C illustrate insertion of a graphic assembly into an existing layout tree structure in one embodiment according to the invention.
Figure 9B:
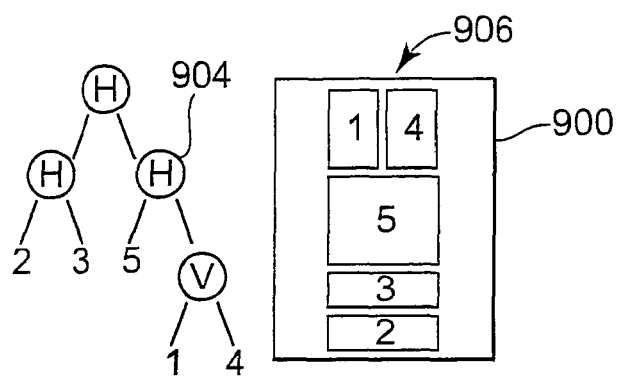
Figure 9C:
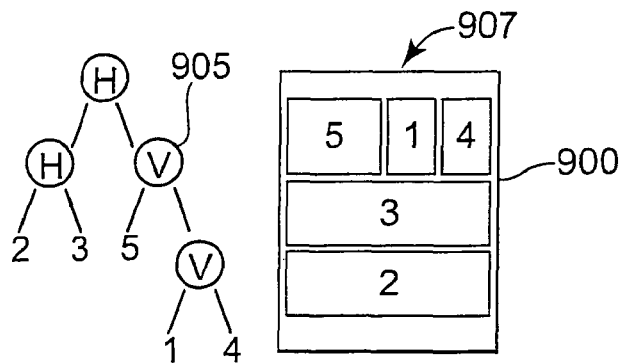

Insertion of each graphic assembly into an existing layout tree structure operates as follows. For a tree T having N graphic assemblies, the system may seek to add the $(N+1)^{st}$ graphic assembly. Referring to FIGS. 9A-9C, according to the method, the system inserts the graphic assembly at a particular location of T in three steps. First, the subtree rooted at the location is removed, and replaced with a new node having either horizontal or vertical orientation. FIG. 9A shows a tree 901 having four associated graphic assemblies (GA1, GA2, GA3, and GA4) and a desire to insert a fifth graphic assembly, GA5, into a layout on a page 900. The existing layout without GA5 is shown as layout 902. FIG. 9B shows replacement of the subtree 903 with a new node 904, associated with a horizontal division "H". Second, the new graphic assembly GA5 is positioned as a child of the new node 904. FIG. 9B shows the new graphic assembly GA5 placed as a child of the new node 904. Finally, the subtree of T rooted at the original location (subtree 903) is positioned as the other child of the new node 904. From FIG. 9B, according to the method, the system locates the new graphic assembly GA5, next to the subtree 903 of T rooted at the original node, and locates the original graphic assemblies, here graphic assemblies GA1 and GA4, as children of the new node 904 because they are included in the subtree 903. This three phase process is further illustrated in FIG. 9C. In FIG. 9C, the new graphic assembly GA5 is inserted at the new node 905 associated with a vertical division "V".

In operation, the layout is adjusted to fit within the usable area of the page 900, irrespective of whether the aspect ratios of layout and usable area are equal. In the example of FIG. 9A, the layout 902 has an aspect ratio approximately equal to the aspect ratio of the page 900. In both the trial layouts of FIGS. 9B and 9C, shown on the page 900 as layouts 906 and 907, respectively, the layout is scaled to fit inside the page 900. The two trial layouts 906, 907 have a different aspect ratio than the original layout 902, and all the graphic assemblies in the layout adjust to the newly added graphic assembly GA5. According to the method, the system adjusts existing graphic assemblies GA1, GA2, GA3, and GA4 in size and not aspect ratio.

Figure 10:
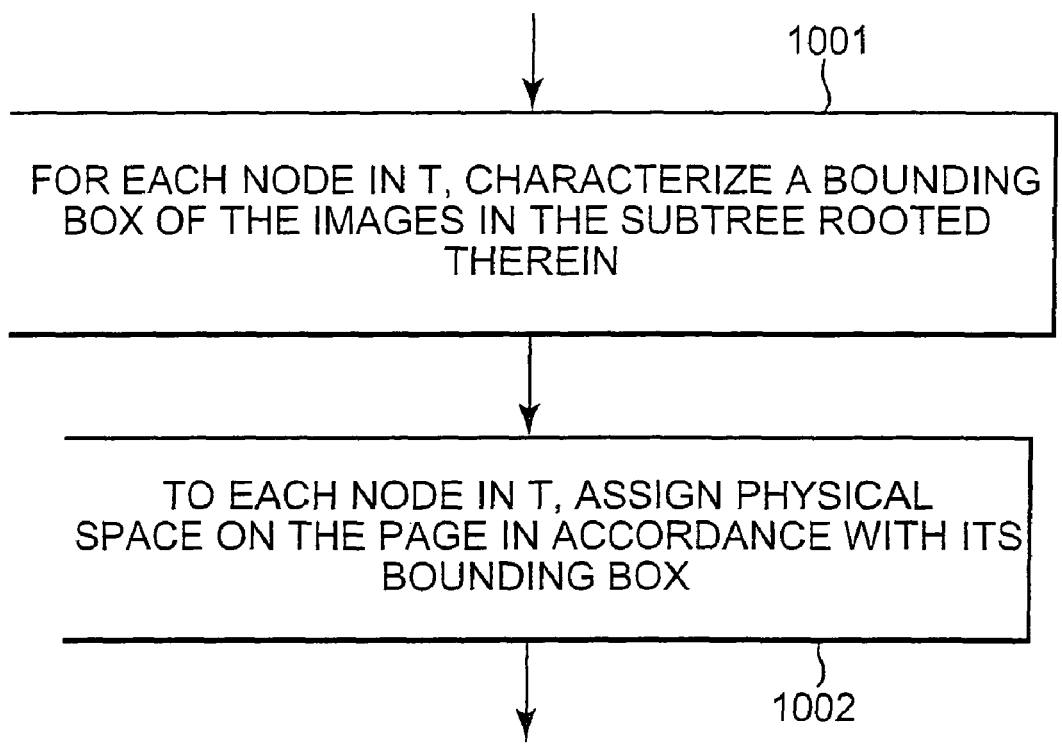
FIG. 10 is a flowchart of one normalization process according to the invention.

Normalization of a layout is shown in FIG. 10. Normalizing a layout refers to the steps required to determine the areas of variable-area graphic assemblies, and makes the layout generally consistent with the desired style, such as strict area style or brick style. From FIG. 10, block 1001 states that for each node in T, the system characterizes a bounding box of the images in the subtree rooted therein. Block 1002 operates by, for each node in T, assigning physical space on the page in accordance with its bounding box. Thus, irregularly shaped images, images with captions, and so forth, may be uniformly defined and positioned in a visually acceptable format. One exemplary operation of blocks 1001 and 1002 is described in co-pending U.S. patent application Ser. No. 10/675,823, filed Sep. 30, 2003, titled "Single Pass Automatic Photo Album Page Layout", having common inventorship herewith, which is hereby incorporated by reference in its entirety.

In one embodiment according to the invention, normalization of a candidate layout requires a determination whether an established candidate layout is "feasible." If a determination is made that a candidate layout is feasible, then the areas of variable-area graphic elements within the graphic assemblies are determined. A layout is "feasible" if the graphic assemblies and user or system-specified fixed spaces between graphic assemblies and/or graphic elements all fit inside the usable area of the page.

Figure 11A:
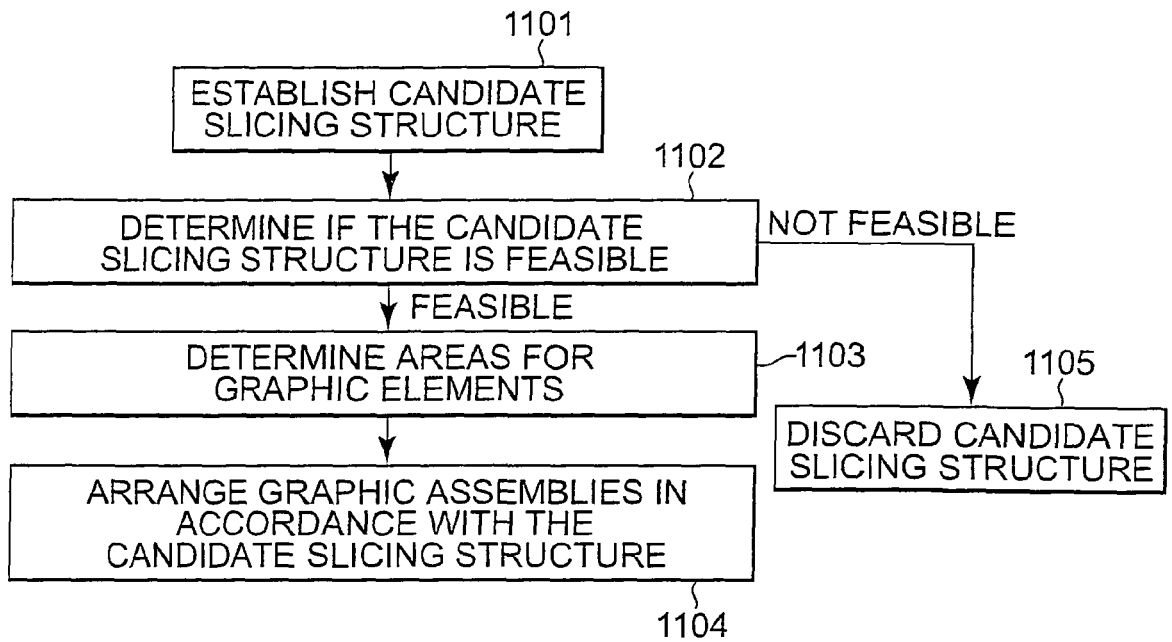
FIGS. 11A and 11B are a flowcharts of another normalization process according to the invention.
Figures 12A, 12B:
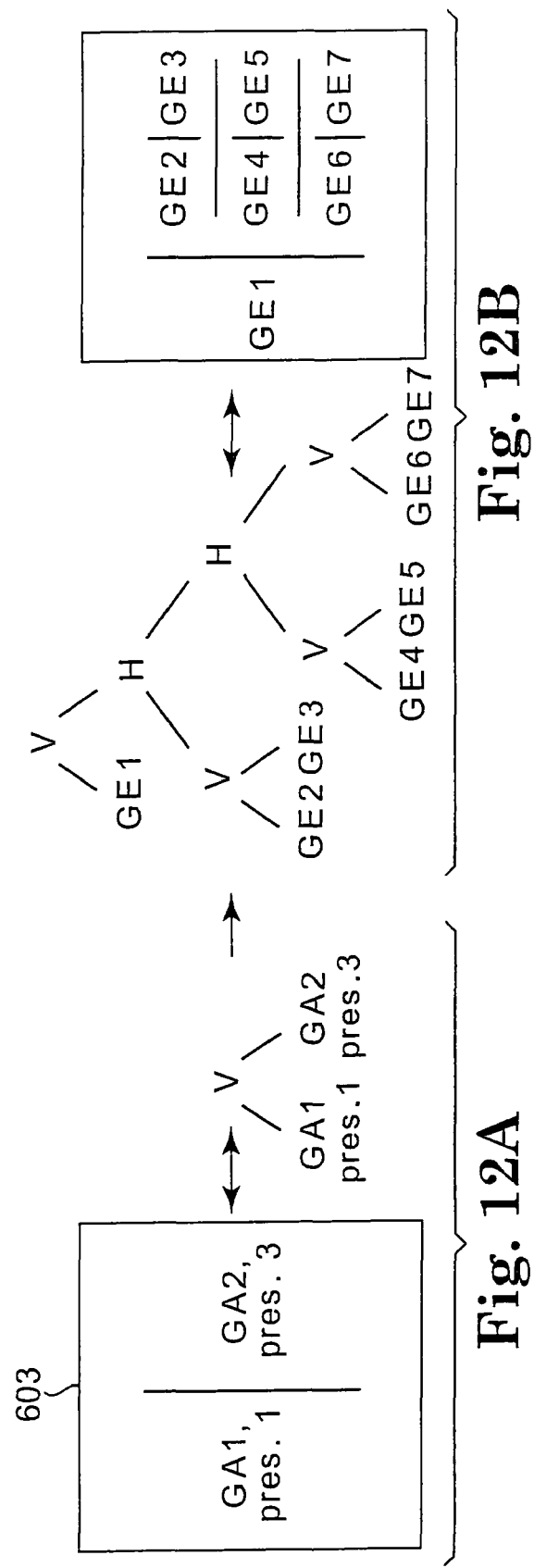
FIGS. 12A and 12B illustrate the translation of a candidate slicing structure to a complete slicing structure.

With reference to FIG. 11A, a candidate slicing structure and its associated tree structure is established (step 1101). The candidate slicing structure and its corresponding tree structure may be established as described above, where each terminal node or leaf of the tree is associated with a graphic assembly presentation. Because a graphic assembly may include more than one graphic element, the candidate slicing structure is translated to a "complete" slicing structure (CSS) where each terminal node or leaf of the corresponding tree is associated with a graphic element (i.e., individual photo, keyframe, etc.). This is a straightforward operation as illustrated in FIGS. 12A and 12B (which use the layout 603 of FIG. 6 as an example), because each graphic assembly presentation is itself represented by a slicing structure. In FIG. 12A, the terminal node associated with presentation 3 of GA2 is replaced with the tree structure representing the third presentation of GA2, to create the CSS of FIG. 12B. In the case where each graphic assembly is a single graphic element, then the CSS is identical with the candidate slicing structure.

Referring again to FIG. 11A, after the candidate slicing structure is established and translated to a CSS, the feasibility of the CSS is determined (step 1102). In response to a CSS being feasible, the areas of variable area graphic assemblies and/or graphic elements may be determined (step 1103) and then arranged in accordance with the CSS (step 1104). If a CSS is determined to not be feasible, it is discarded (step 1105).

Figure 11B:
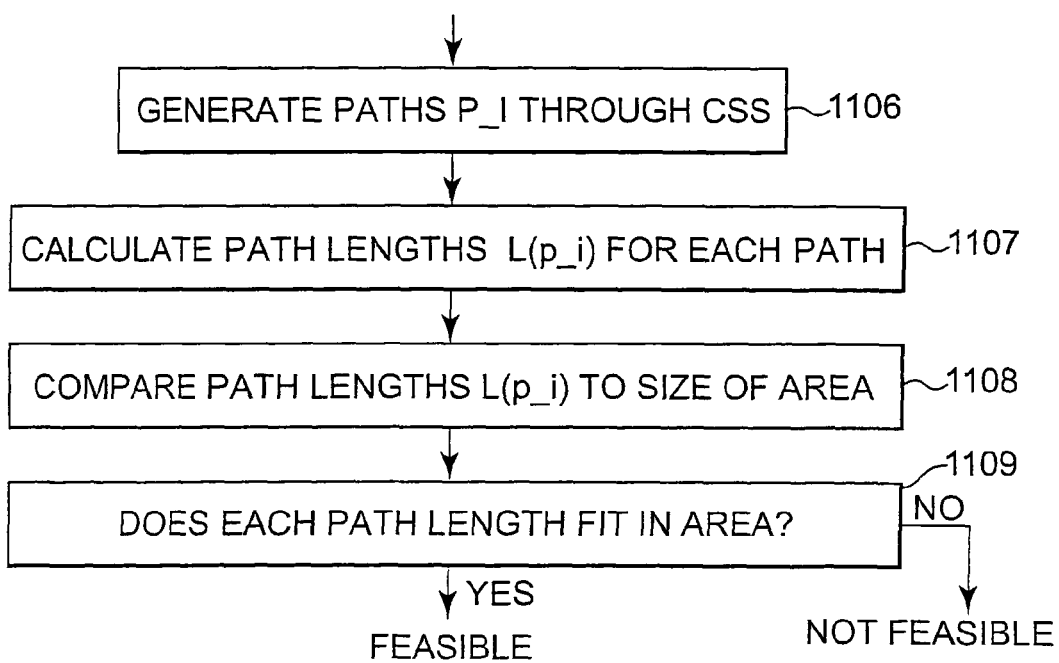

In one embodiment, determining the feasibility of the CSS in step 1102 of FIG. 11A is accomplished as illustrated in FIG. 11B. Referring to FIG. 11B, paths through the CSS are generated (step 1106), where the $i^{th}$ path is denoted as p_i, and the path lengths L(p_i) are then calculated for each path (step 1107). One implementation of step 1106 is described below with reference to FIGS. 13A and 13B. The path lengths are compared to the size of the available area (step 1108), and the layout is determined to be feasible if each path fits within the available area (step 1109).

Figure 13A:
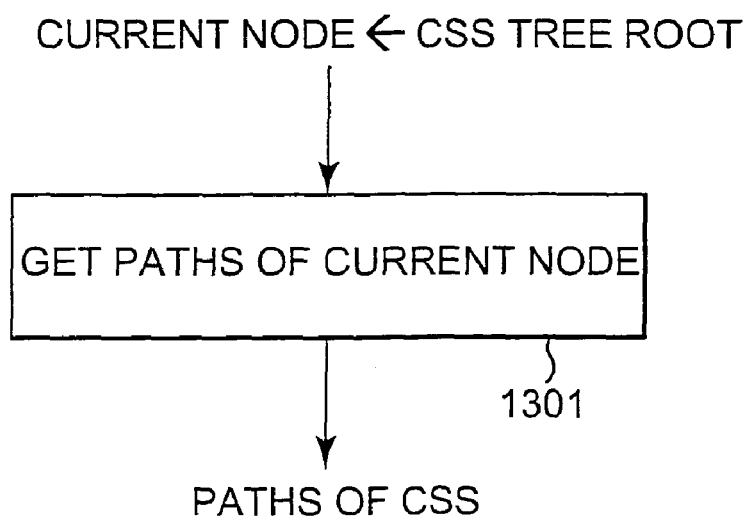
FIG. 13A is a flowchart illustrating the generation of paths through a complete slicing structure according to the invention.
Figure 13B:
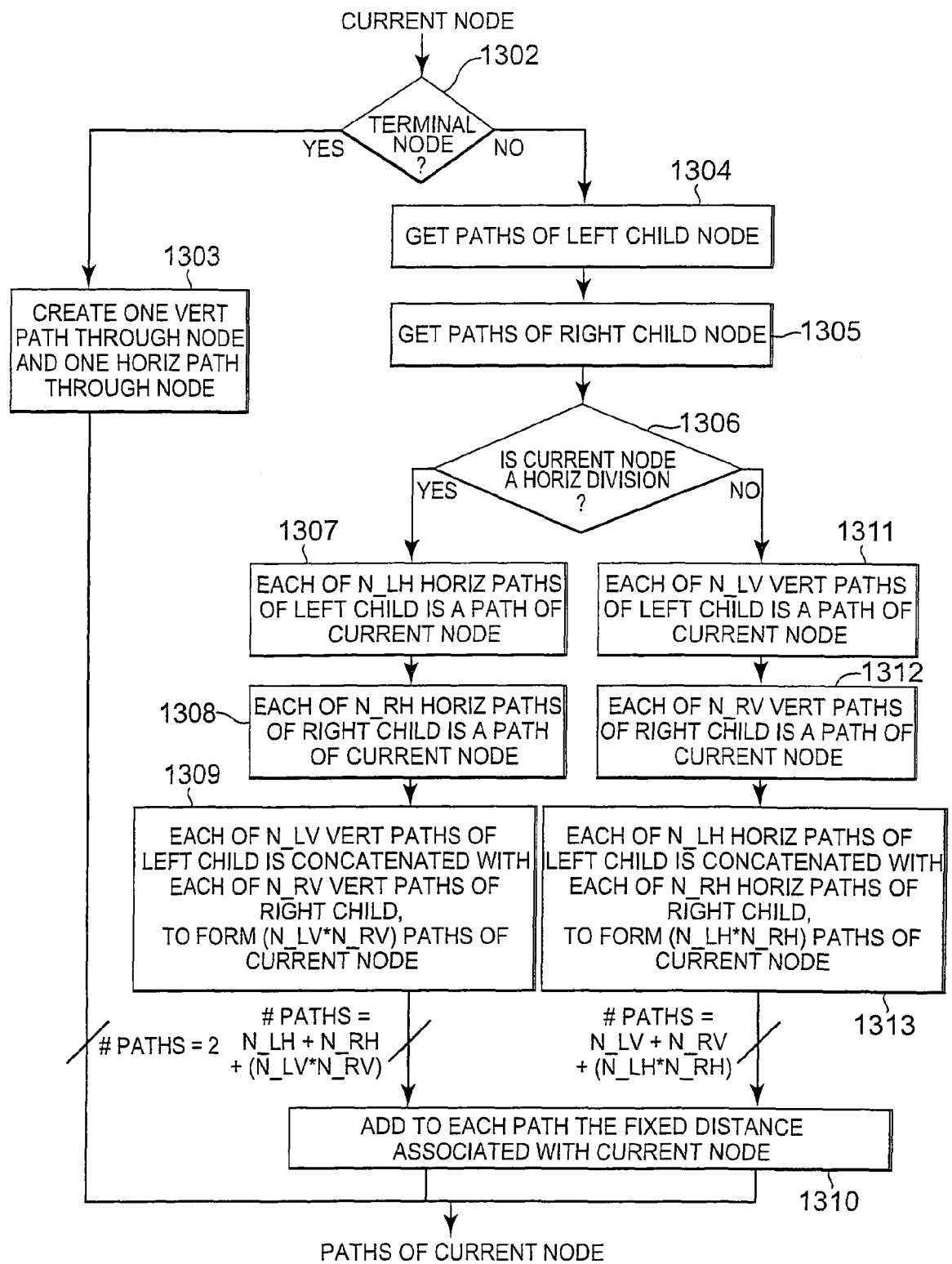
FIG. 13B is a flowchart illustrating one embodiment of a recursive method for generating paths through a complete slicing structure according to the invention.
Figure 14A:
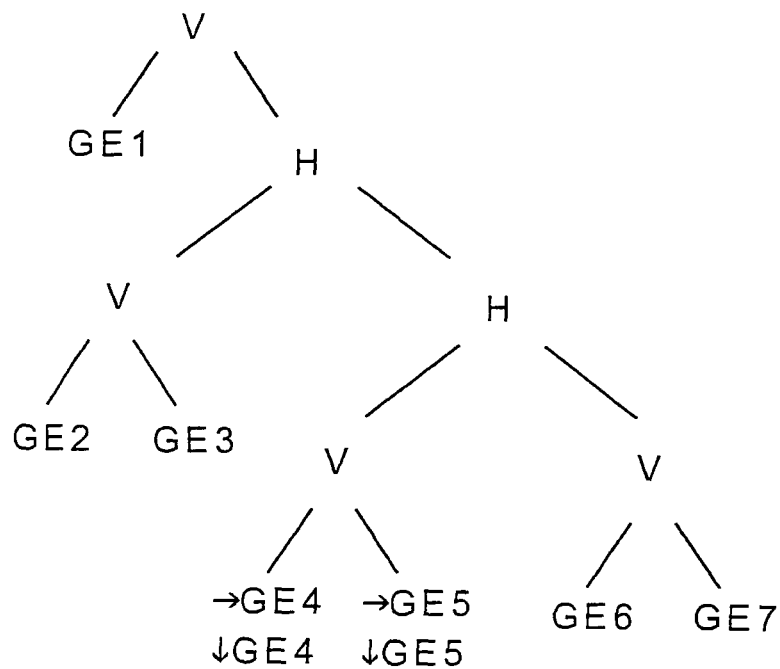
FIGS. 14A-14E illustrate the process generating paths according to the method of FIG. 13.
Figure 14B:
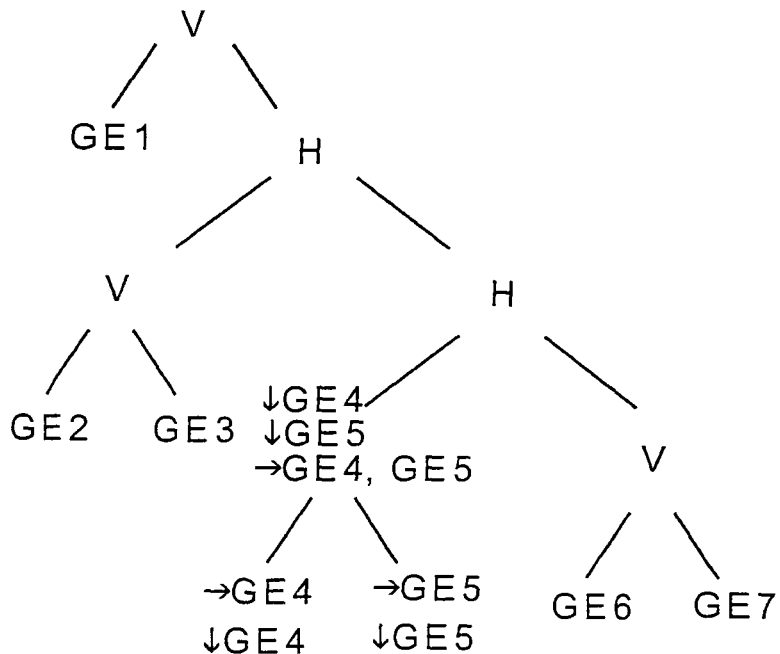
Figure 14C:
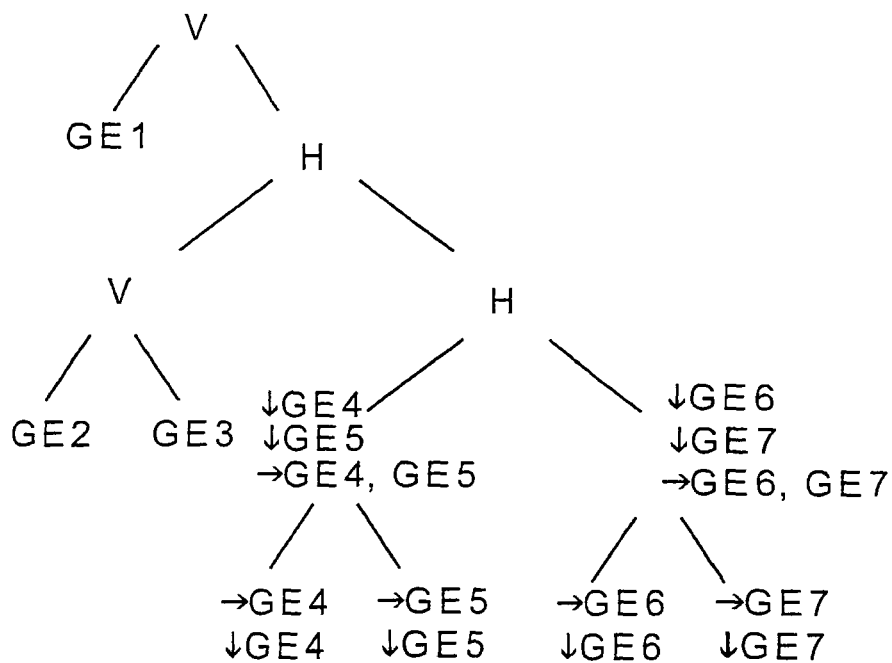
Figure 14D:
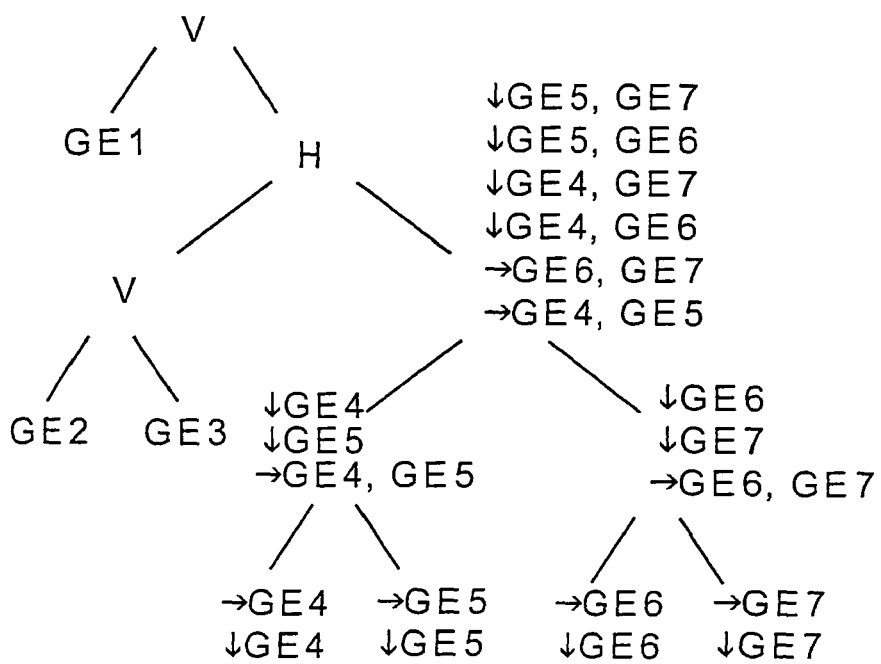
Figure 14E:
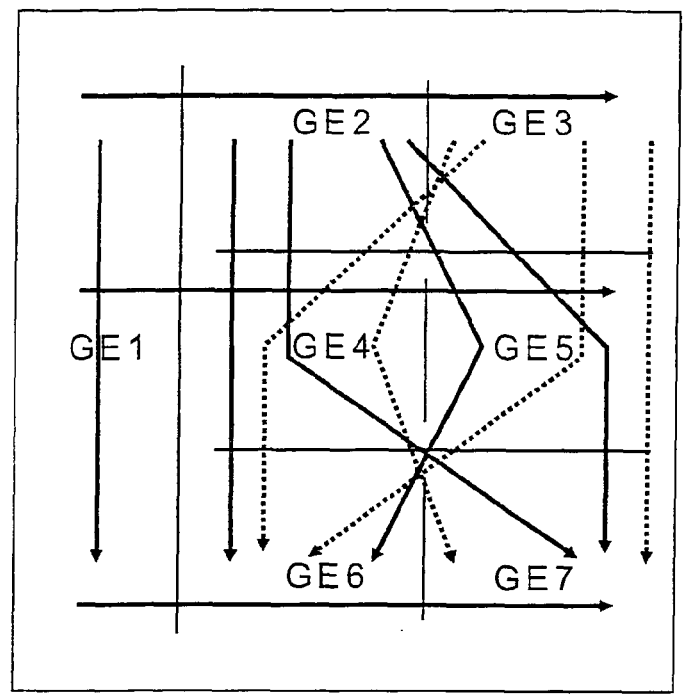

Referring to FIG. 13A, a complete set of paths through the CSS is determined by setting the root node of the tree corresponding to the CSS as the current node, and submitting the node to a recursive process 1301. One implementation of the recursive path generation process 1301 is illustrated in FIG.

13B In the recursive process, the current node is input into the process and a decision is made at block 1302 whether the current node is a terminal node (i.e., leaf) or not. If the current node is a terminal node, two new paths are started at block 1303: a horizontal path with a single step traveling through the graphic element associated with the terminal node (e.g., from left to right), and a vertical path with a single step traveling through the graphic element (e.g., from top to bottom).

If the current node is not a terminal node, the two child nodes of the current node (i.e., the left child node and the right child node) are submitted to the same recursive process in blocks 1304 and 1305, and then the paths from the two child nodes are combined. Block 1306 determines if the current internal node represents a horizontal division or a vertical division. If the internal node represents a horizontal division, then the node inherits the horizontal paths of its children. In particular, if the internal node represents a horizontal division, then the node inherits each of the N_LH horizontal paths of its left child (block 1307), and each of the N_RH horizontal paths of its right child (block 1308). At block 1309, the node obtains a new set of vertical paths created in a kind of "crossing" operation: each of the N_LV vertical paths of the left-hand child is in its turn concatenated with each of the N_RV vertical paths of the right-hand child to form (N_LV*N_RV) vertical paths of the current node. The number of paths is thus equal to N_LH+N_RH+(N_LV*N_RV). At block 1310, any fixed distances K associated with the current node are added to each path. Fixed distances K may include, for example, dimensions of fixed area graphic elements and user-specified fixed spacing between graphic elements. If the internal node represents a vertical division, then the node inherits the vertical paths of its children. In particular, if the internal node represents a vertical division, then the node inherits each of the N_LV vertical paths of its left child (block 1311), and each of the N_RV vertical paths of its right child (block 1312). At block 1313, the node obtains a new set of horizontal paths created in a kind of "crossing" operation: each of the N_LH horizontal paths of the left-hand child is in its turn concatenated with each of the N_RH horizontal paths of the right-hand child, to form (N_LH*N_RH) horizontal paths of the current node. The number of paths is thus equal to N_LV+N_RV+(N_LH*N_RH). At block 1310, any fixed distances K associated with the current node are added to each path. The paths from the root node are an exhaustive collection of paths through the divisions of the CSS. An example of this process is partially illustrated in FIGS. 14A-14E, using the CSS tree of FIG. 12B.

Referring back to FIG. 11B, the lengths of the vertical and horizontal paths are then calculated (step 1107). If path $p\_i$ is vertical, then its length is $$L(p\_i) = \text{sum(fixed distances through divisions along } p\_i) + \text{sum(heights of fixed-area graphic elements on } p\_i) + \text{sum(heights of variable-area graphic elements on } p\_i) \quad (1)$$

Notice that the height of a graphic element can be written as follows:

$$\text{sqrt}(a*A) = \text{sqrt}(a)*\text{sqrt}(A) = \text{sqrt}(a)*Q$$

where A is the area of the graphic element; a is the aspect ratio; and Q is defined as the square root of the area. So if $p\_i$ is a vertical path, its length can be written $$L(p\_i) = K\_i + \text{sum}\_j(Q\_(i,j)*\text{sqrt}(a\_(i,j))) \quad (2)$$

where K_i is the sum of the first two terms in (1), that is, all the fixed distances along path p_i; and where the "sum over j" is adding up the heights of variable-area graphic elements on path p_i. (Thus, the variable i is used to indicate a path, and for a given path p_i, the variable j indexes across all the variable-area graphic elements along the path.)

From a similar derivation the length of horizontal path p_i can be written $$L(p\_i) = K\_i + \text{sum}\_j(Q\_(i,j)/\text{sqrt}(a\_(i,j))) \quad (3)$$

where K_i is a sum of horizontal fixed distances and widths of fixed-area photos along path p_i.

Determining Whether a Layout is Feasible:

After the horizontal and vertical path lengths L(p_i) through the complete slicing structure (CSS) are known, the path lengths L(p_i) are compared with the size of the area (e.g., height and width) (step 1108). The layout is determined to be feasible if the fixed-distance term K_i for each path p_i fits within the available area on the page (step 1109). That is, the layout is feasible if, for each horizontal path p_i, K_i is less than the width of the usable area; and for each vertical path p_i, K_i is less than the height of the usable area.

Determining Photo Areas in Strict-Area Style Layout

In strict area style layout, each variable-area graphic assembly has an assigned relative area proportion (RAP). In the context of a graphic assembly having more than one graphic element (such as a series of keyframes from a video), a single, "aggregate RAP" is assigned to the entire graphic assembly, and the RAPs of the individual graphic elements in the graphic assembly are set to equal the aggregate RAP divided by the number of graphic elements in the graphic assembly. In the remainder of this section we will assume each object is a graphic element with a positive RAP denoted "e."

Since a RAP is proportional to the actual area, the variable Q introduced above, can be rewritten as follows $$Q = g*\text{sqrt}(e)$$

where g is a positive scalar such that $g^2$ multiplied by the RAP is an absolute measurable area (e.g., square inches). The ratio of Q divided by sqrt(e) is a constant across all variable-area graphic elements, so that the same value of g is used for all variable-area graphic elements on the page. Thus, in equations (2) and (3) above, when substituting g*sqrt(e) for Q, g can be pulled out of the summation terms to arrive at:

$$L(p\_i) = K\_i + g*\text{sum}\_j(\text{sqrt}(e\_(i,j))*\text{sqrt}(a\_(i,j))) \quad (4)$$

$$L(p\_i) = K\_i + g*\text{sum}\_j(\text{sqrt}(e\_(i,j))/\text{sqrt}(a\_(i,j))) \quad (5)$$

where e_(i,j) is the relative area proportion of the j-th variable-area graphic element situated on path p_i.

If path p_i is a vertical path and the available area on the page has height H, then solving the following equation for g_i yields the value for which p_i is exactly as long as the available area is high:

$$K\_i + g\_i*\text{sum}\_j(\text{sqrt}(e\_(i,j))*\text{sqrt}(a\_(i,j))) = H \quad (6)$$

Similarly, if path p_i is a horizontal path and the available area has width W, then solving the following equation for g_i yields the value for which the path fits exactly across the available area:

$$K\_i + g\_i*\text{sum}\_j(\text{sqrt}(e\_(i,j))/\text{sqrt}(a\_(i,j))) = W \quad (7)$$

In one embodiment, areas for variable-area graphic elements are made as large as possible, while still allowing all the graphic elements to fall completely on the usable area of the page, by (for each path p_i) solving for g_i using either equation (6) or (7), depending on whether p_i is a vertical or horizontal path. Because the layout has previously been determined to be feasible, as described above, each solution for g_i will be positive. If g* is defined to be the smallest solution across all the paths:

$$g^* = \min\_i(g\_i)$$

then the area of the j-th variable-area graphic element is computed as $$A\_j = (g^*)^2 * e\_j$$

where e_j is the RAP assigned to the j-th variable-area graphic element.

Determining Graphic Element Areas in Brick Style Layout

In brick style layouts, relative area proportions are not used, and all graphic elements are of variable area. Graphic element areas are determined by first computing values of Q. Once the values of Q are known, they can be squared to compute absolute, measurable areas (e.g., square inches). Values of Q are computed for two scenarios: (1) the height of the area occupied by graphic elements is constrained to equal the height of the usable area on the page; and (2) the width of the area occupied by graphic elements is constrained to equal the width of the usable area on the page. In most cases, only one of scenarios (1) and (2) will yield a feasible solution because in the other scenario, the unconstrained dimension will be greater than the available space. The scenario yielding the feasible solution is selected to produce the final set of graphic element areas.

In either scenario (1) or (2), values of Q are computed as the solution to a linear system of equations having N unknowns, where N is the number of graphic elements. N−1 of the equations come directly from the interior nodes of the tree corresponding to the complete slicing structure (CSS), because in a CSS tree accommodating N graphic elements, there are exactly (N−1) interior nodes.

For an interior node that represents a vertical division or cut of the area, the equation is obtained by first obtaining two vertical paths, one path from each of its two children, and setting their lengths to be equal. Referring to equation (2) above, denoting the vertical path from the left-hand child as p_L, and from the right-hand child as p_R, the equation is $$K\_R + \text{sum}\_j(Q(R,j) * \text{sqrt}(a\_(R,j))) = K\_L + \text{sum}\_k(Q(L,k) * \text{sqrt}(a\_(L,k)))$$

where the variable j indexes over the graphic elements along p_R, and k indexes over the graphic elements along p_L. Rearranging the equation yields $$\text{sum}\_j(Q(R,j) * \text{sqrt}(a\_(R,j))) - \text{sum}\_k(Q(L,k) * \text{sqrt}(a\_(L,k))) = K\_L - K\_R \quad (8)$$

The situation is analogous for an interior node that represents a horizontal division or cut of the area. Two horizontal paths are obtained, and their lengths set to be equal, yielding $$\text{sum}\_j(Q(R,j) / \text{sqrt}(a\_(R,j))) - \text{sum}\_k(Q(L,k) / \text{sqrt}(a\_(L,k))) = K\_L - K\_R \quad (9)$$

By constructing an equation of the form of either (8) or (9) for each interior node, N−1 equations are obtained for N unknowns.

For scenario 1, the $N^{th}$ equation is obtained by setting the length of any vertical path from the root node equal the height of the available area. For scenario 2, the $N^{th}$ equation is obtained by setting the length of any horizontal path from the root node equal the width of the available area.

For either scenario, the N equations are written in matrix-vector form (Ax=b). The matrix contains only zeros, positive and negative square roots of graphic element aspect ratios, and positive and negative inverses of square roots of graphic element aspect ratios. The N elements of vector x are the sought-after Q variables, and b is a column vector of dimension N where each element is computed as the right-hand side of either (8) or (9), or is equal to the height (scenario 1) or width (scenario 2) of the available area. Computing inverse (A)*b yields the vector of Q values.

In one embodiment, the area of variable-area graphic elements is determined for every candidate layout using the process of FIG. 11. When there is at least one fixed-area graphic assembly or graphic element, or if the specified fixed distance between graphic elements is not small compared to the available page area, then using the process of FIG. 11 is necessary to ensure that areas for the variable-area graphic assemblies are sized such that space is reserved for the fixed-area elements (e.g., fixed-area graphic assemblies, fixed-area graphic elements, and/or fixed spacings).

In another embodiment, when the graphic assemblies include only variable area graphic elements and the specified fixed distance between graphic element is small compared to the available page area, the process of FIG. 11 is used only as a finishing step after incorporating all graphic assemblies into the tree. The result of using the process of FIG. 11 as a "finishing" step is that the graphic element sizes are in accordance with both the page dimensions and the required fixed spacing between graphic elements.

Determining Precise Positions for the Graphic Elements

For either strict area or brick style layouts, once the graphic element areas are known it is possible to arrange the graphic elements on the page, generating a complete layout. Because graphic element areas have previously been determined, it is only necessary to find graphic element positions.

Figure 15A:
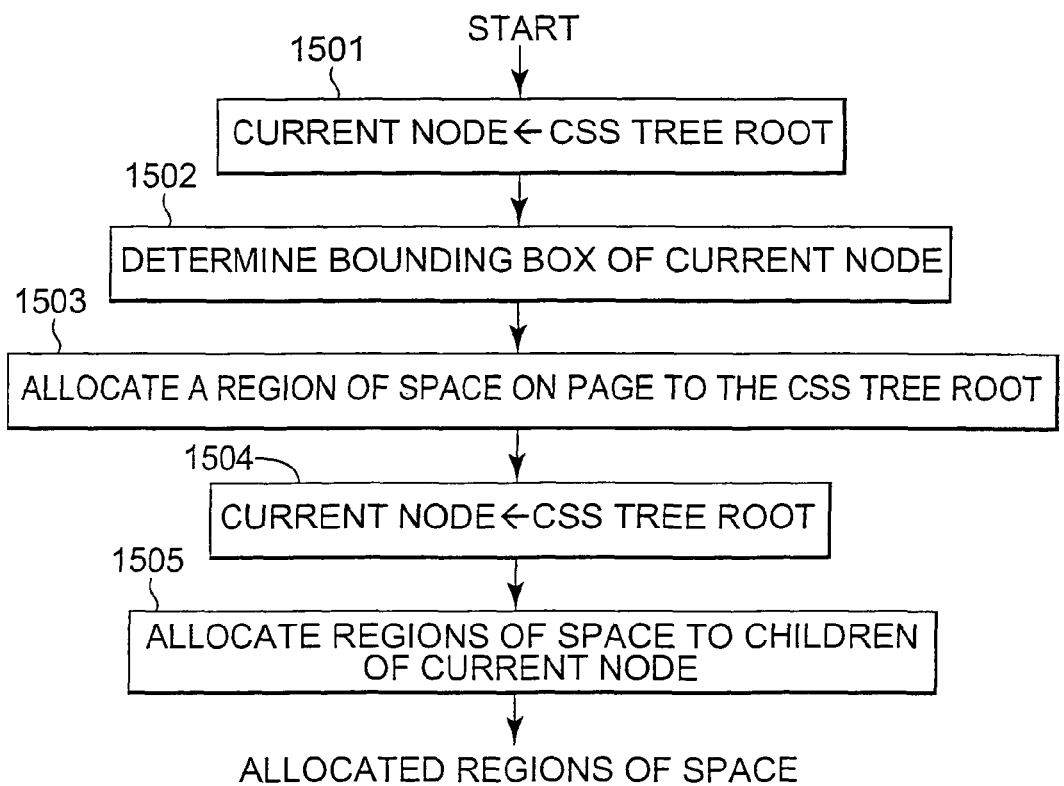
FIG. 15A is a flowchart illustrating one embodiment of a method for determining graphic element positions according to the invention.

Referring to FIG. 15A, regions of space on a page are allocated to graphic elements. First, the root node of the CSS tree is set to the current node (block 1501), and a bounding box that encloses the current node is determined using a recursive process (block 1502). One implementation of the recursive process of block 1502 is described below with reference to FIG. 15B. Next, a physical region of space on the page is allocated to the root node in the CSS tree (block 1503). One implementation of block 1503 is described below with reference to FIG. 15C. In one implementation, the region allocated to the root node has the area and aspect ratio of the bounding box for the root obtained in block 1502, and it is centered on the usable area of the page. Next, the current node is again set to be the root node of the CSS tree (block 1504), and then regions of space are allocated to children of the current node using a recursive process (block 1505). One implementation of block 1505 is described below with reference to FIG. 15D.

Figure 15B:
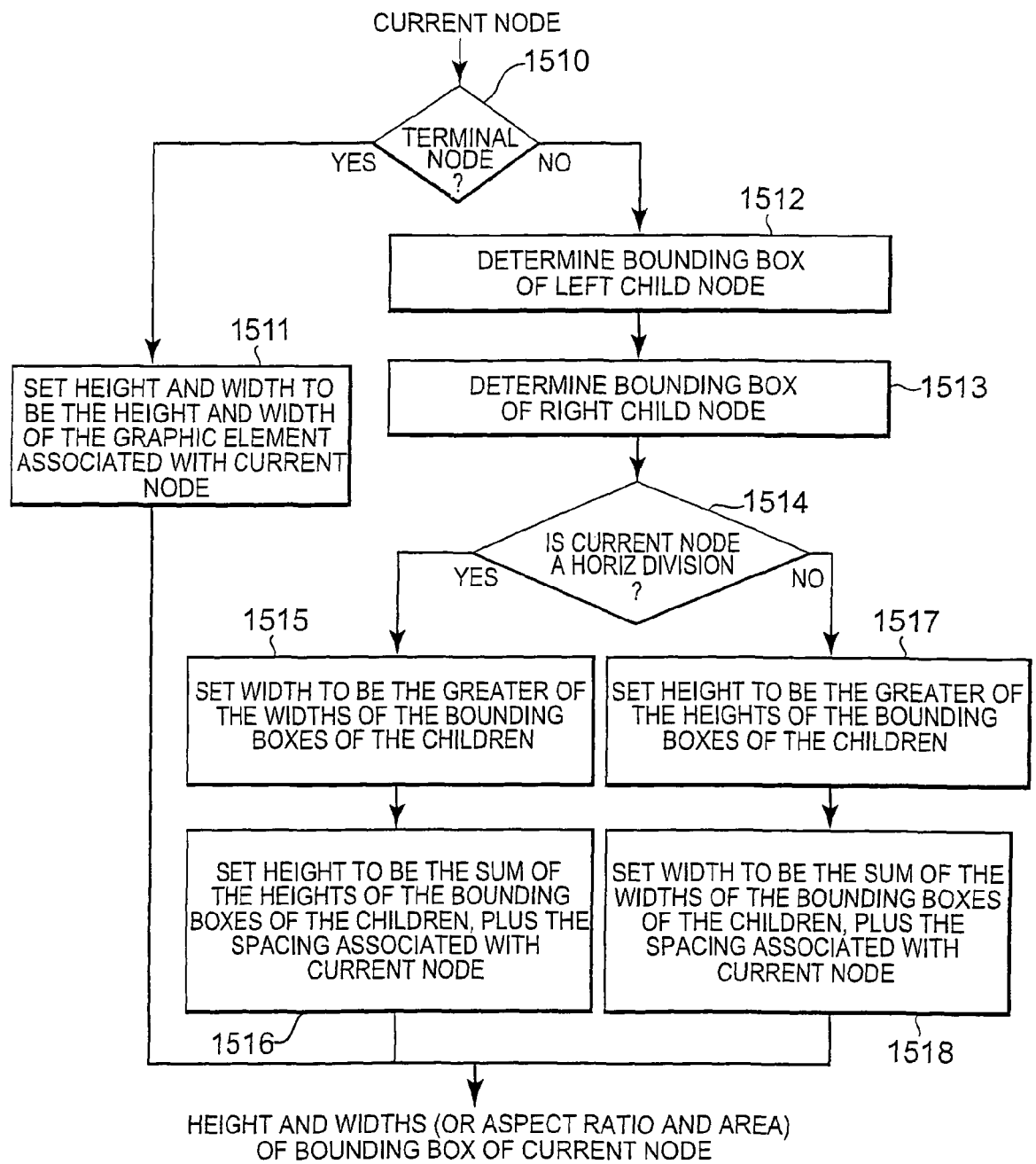
FIG. 15B is a flowchart illustrating one embodiment of a method for determining a bounding box of a node according to the invention.

Referring to FIG. 15B, for each interior node in the CSS tree, a bounding box is determined that encloses the graphic elements and fixed spacing between graphic elements by submitting the current node to a recursive subroutine. In the recursive subroutine, a decision is made whether the current node is a terminal node (block 1510). If the current node is a terminal node, a bounding box is established that has the height and width of the associated graphic element (block 1511). If the current node is not a terminal node, the two child nodes of the current node (i.e., the left child node and the right child node) are submitted to the same recursive process in blocks 1512 and 1513, and then the bounding boxes of the two children are combined to form the bounding box for the current node as follows: Block 1514 determines if the current node is a horizontal division or a vertical division. If the current node represents a horizontal division, then the width of the bounding box is defined to be the width of the wider of the bounding boxes of the two children (block 1515), and the height of the bounding box is determined as the sum of the heights of the bounding boxes of the two children, plus the fixed spacing distance assigned to the node itself (block 1516). If the current node represents a vertical division, the height of the bounding box is defined to be the height of the taller of the bounding boxes of the two children (block 1517), and the width of the bounding box is determined as the sum of the widths of the bounding boxes of the two children, plus the fixed-spacing distance assigned to the node itself (block 1518). This process repeats until the bounding box for the root node is computed.

Figure 15C:
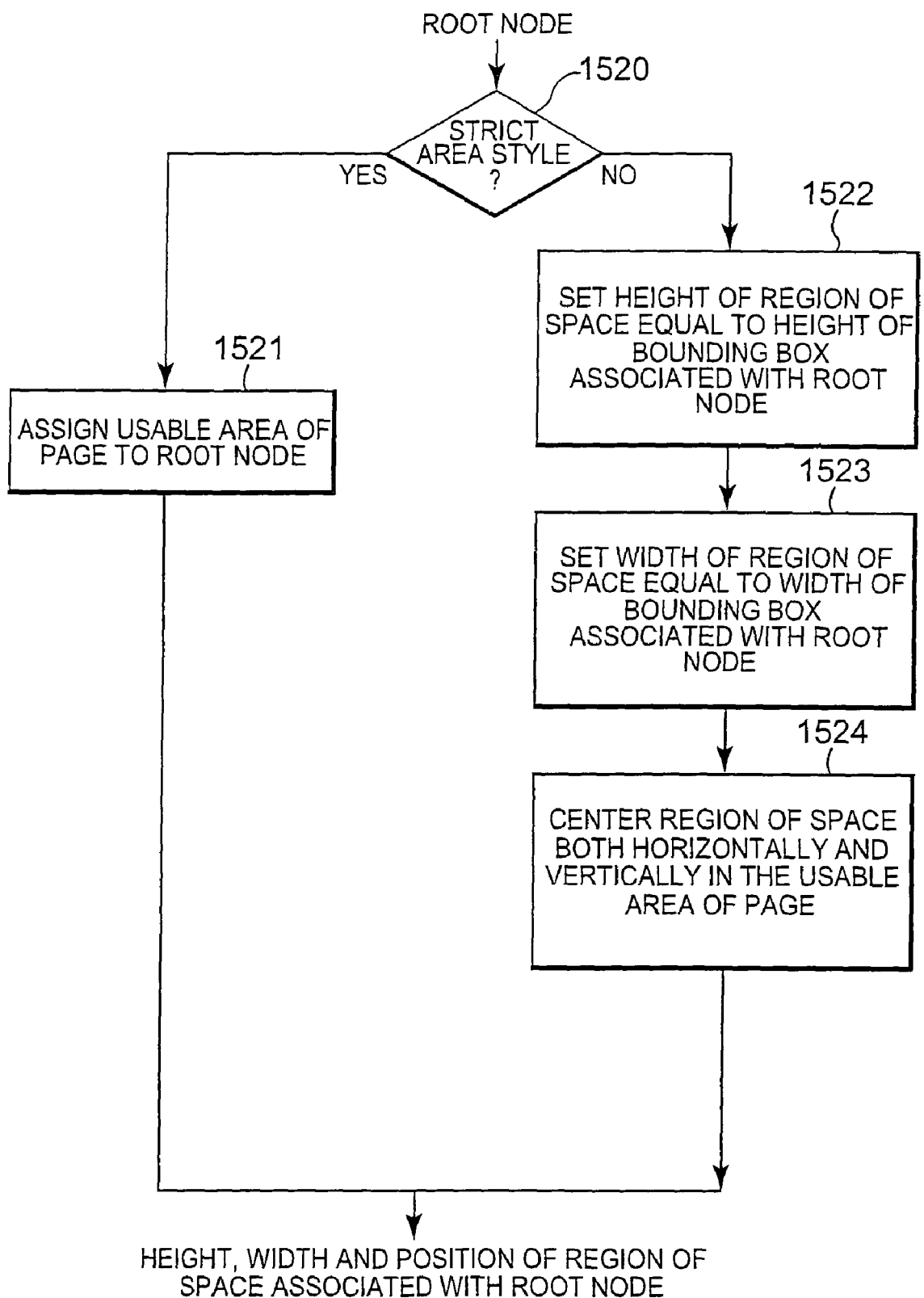
FIG. 15C is a flowchart illustrating one embodiment of a method for assigning a region of space to a root node according to the invention.

Referring to FIG. 15C, a physical region of space on the page is allocated to the root node in the CSS tree. The process of the second step depends upon the layout style. The layout style is determined at block 1520. For strict area style layout, the region assigned to the root node is the entire usable area of the page (block 1521). For brick style layout, the region assigned to the root node has the height of the bounding box for the root obtained above (block 1522), and the width of the bounding box for the root obtained above (block 1523). The region is then centered in the usable area of the page (block 1524).

Figure 15D:
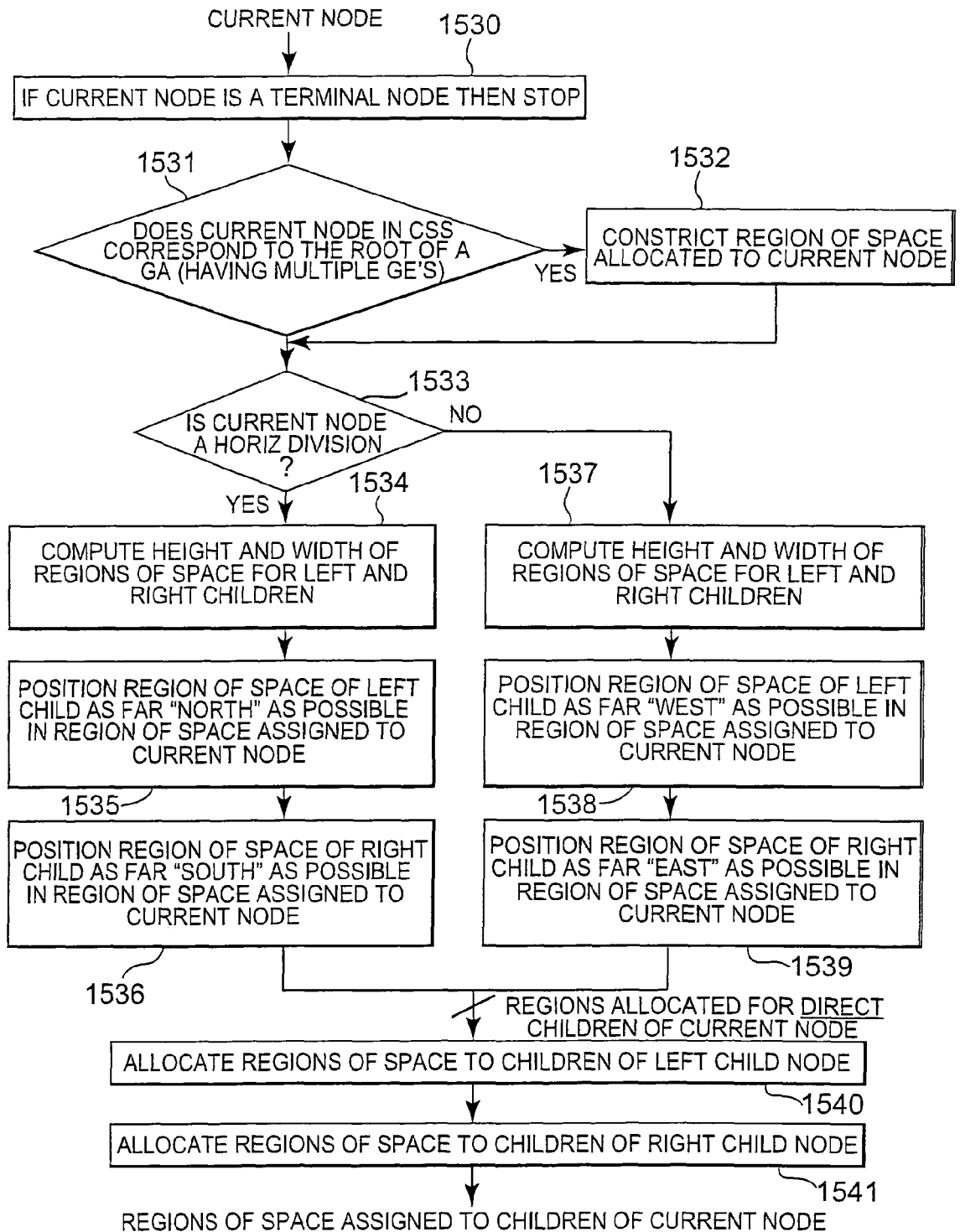
FIG. 15D is a flowchart illustrating one embodiment of a method for allocating regions of space to children of a node according to the invention.

Referring to FIG. 15D, the region of space assigned to each interior node is divided between its two direct children. The division is accomplished by setting the root node of the CSS tree to the current node, and implementing a recursive process. In the recursive process, a decision is made whether the current node is a terminal node (block 1530). If the current node is terminal node, or "leaf", then nothing is done. If the current node is an interior node, a determination is made whether the current node is the root node of a tree corresponding to a graphic assembly having more than one graphic element (block 1531). If this is the case, then the region assigned to the current node is "constricted" (block 1532) by reassigning the height and width of the region to be the height and width of the bounding box previously computed for the current node, and the position of the region is centered in the region previously assigned to the current node. In brick style layout this has no effect. In strict area style layout, this has the effect of pulling together the images in a graphic assembly having more than one graphic element (such as a series of keyframes). The process then progresses to block 1533. If at block 1531 it is determined that the current node is not the root node of a tree corresponding to a graphic assembly having more than one graphic element, the process progresses directly to block 1533. Block 1533 determines whether the current node represents a horizontal division of the page, or a vertical division of the page. If the current node represents a horizontal division, the height and width of the regions of space for left children and right children are computed (block 1534), using the process of FIG. 15E. The region of space of the left child is positioned as far "north" as possible in the region of space assigned to the current node (i.e., as far toward the top as possible) (block 1535). The region of space of the right child is positioned as far "south" as possible in the region of space assigned to the current node (i.e., as far toward the bottom as possible) (block 1536). If the current node represents a vertical division, the height and width of the regions of space for left children and right children are computed (block 1537), using the process of FIG. 15E. The region of space of the left child is positioned as far "west" as possible in the region of space assigned to the current node (i.e., as far toward the left as possible) (block 1538). The region of space of the right child is positioned as far "east" as possible in the region of space assigned to the current node (i.e., as far toward the right as possible) (block 1539). The regions of space are thus allocated for the direct children of the current node. The process described above is repeated to allocate regions of space to children of the left child node (block 1540), and to allocate regions of space to children of the right child node (block 1541). The process is repeated until regions of space are assigned to all children (direct or otherwise) of the current node.

Figure 15E:
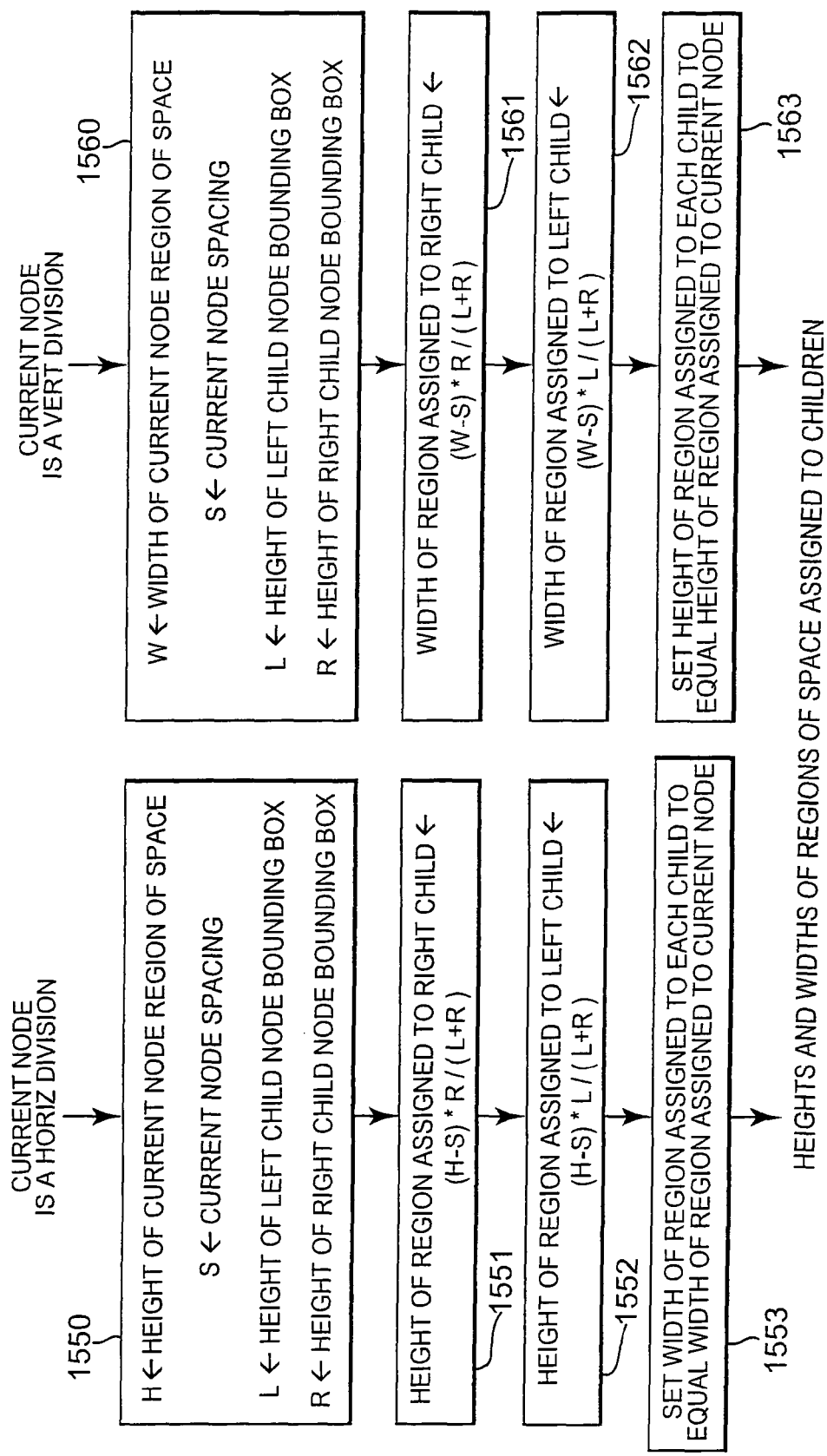
FIG. 15E is a flowchart illustrating one embodiment of a method for computing the height and width of regions of space for left and right hand children according to the invention.

Referring to FIG. 15E, a method for computing height and width of the regions of space for left and right hand children is illustrated, for both nodes representing a horizontal page division and nodes representing a vertical page division. For nodes representing a horizontal division, the system first sets certain variables (block 1550), including: the height of the current node region of space, H; the current node spacing, S; the height of the left child node bounding box, L; and the height of the right child node bounding box, R. The height of the region assigned to the right child is set to $(H-S)*R/(L+R)$ (block 1551). The height of the region assigned to the left child is set to $(H-S)*L/(L+R)$ (block 1552). The width of the region assigned to each child is set to equal the width of the region assigned to the current node (block 1553).

For nodes representing a vertical division, the system first sets certain variables (block 1560), including: the width of the current node region of space, W; the current node spacing, S; the height of the left child node bounding box, L; and the height of the right child node bounding box, R. The width of the region assigned to the right child is set to $(W-S)*R/(L+R)$ (block 1561). The width of the region assigned to the left child is set to $(W-S)*L/(L+R)$ (block 1562). The height of the region assigned to each child is set to equal the height of the region assigned to the current node (block 1563).

In a final step, for each terminal node, the graphic element is centered inside the assigned region.

Scoring

Once the areas of any variable-area graphic assemblies have been determined, the layout is scored (blocks 705, 719 and 721 of FIG. 7). The scoring function may have significant effects on the visual quality of the layout. The way the layout is scored depends upon the layout style (strict area layout style or brick layout style). In strict area style, the score is the sum of the areas of the variable-area graphic elements.

In brick style, an initial score may be computed as an initial score, such as:

$$initial\_score = 1.5 * alpha + consistency$$

Alpha is a numeric value that measures how well the aspect ratio of the page agrees with the aspect ratio of the bounding box around the graphic assemblies on the page. Consistency measures the variation in the areas occupied by graphic assemblies on the page, and may be computed as the area of the smallest graphic assembly on the page, divided by the area of the largest graphic assembly on the page. For alpha and consistency, a value of, for example, 1.0 represents an ideal, and a value of, for example, 0.0 represents the worst available alpha or consistency.

In one embodiment, alpha and consistency have values between 0 and 1, and are computed as follows:

$$Alpha = min(page\_aspect, pbb\_aspect) / max(page\_aspect, pbb\_aspect)$$

where page_aspect is the aspect ratio of the usable area on the page; and pbb_aspect is the aspect ratio of the "principal bounding box," or the bounding box associated with the root node.

$$consistency = min(area\ of\ GA's\ on\ page) / max(area\ of\ GA's\ on\ page)$$

where the area of a graphic assembly (GA) is computed as the sum of the areas of the graphic elements in the graphic assembly.

Other initial scores may be computed. This initial score may be penalized for values of alpha and/or consistency that are below predetermined thresholds, and, according to the method, the system may compare resultant scores for different parameters than specified above. For example, in one embodiment, the alpha and consistency terms may take into account any space between graphic elements within a graphic assembly. However, in other applications, the area between graphic elements within a graphic assembly is small compared to the areas of the graphic elements themselves, and the space may be neglected.

The foregoing description affords the ability to develop a visually pleasing layout while affording the user the ability to provide certain inputs. In the "strict area" style of layout, the present invention provides a simple mapping between the general arrangement of photos (i.e. a "slicing structure"), and a precise spatial distribution. In one embodiment, the present invention makes certain that any two neighboring graphic elements will be at least a specified distance apart. In the "brick" style of layout, one embodiment of the present invention makes certain that neighboring graphic elements are separated by exactly a specified distance. Both these styles of layout can be accomplished without requiring that graphic elements be cropped.

Although exemplary embodiments have been illustrated and described herein for purposes of description, it will be appreciated by those of ordinary skill in the art that a wide variety of alternate and/or equivalent implementations may be substituted for the specific embodiments shown and described without departing from the spirit and scope of the present invention. This application is intended to cover any adaptations or variations of the embodiments discussed herein. Therefore, it is manifestly intended that the foregoing discussion is illustrative only, and the invention is limited and defined only by the following claims and the equivalents thereof.

What is claimed is:

1. A machine-implemented method of arranging a set of graphic assemblies within an area, comprising:
   establishing a candidate tree having at least one node and at least one leaf, wherein each node corresponds to a respective partition of the area, each leaf defines a relative position of a different respective one of the graphic assemblies in the area, and at least one of the graphic assemblies is a multi-element graphic assembly that comprises a respective group of multiple discrete graphic elements arranged in one of multiple possible relative positional arrangements within the area;
   determining if the candidate tree is a feasible candidate tree; and
   in response to a determination that the candidate tree is a feasible candidate tree, arranging the set of graphic assemblies within the area in accordance with the candidate tree.

2. The method of claim 1, wherein determining if the candidate tree is a feasible candidate tree comprises:
   generating a set of path lengths through the candidate tree; and
   verifying a fixed distance term for each path length fits within the area.

3. The method of claim 2, further comprising determining an area of each of the set of graphic assemblies.

4. The method of claim 1, wherein establishing a candidate tree associated with the set of graphic assemblies comprises:
   associating a first graphic assembly with a tree structure to form a candidate tree;
   modifying the candidate tree to form at least one alternate candidate tree by associating a subsequent graphic assembly with at least one available location in the candidate tree;
   computing scores for each alternate candidate tree with the subsequent graphic assembly in each available location on the candidate tree;
   selecting the alternate candidate tree having a best score;
   designating the alternate candidate tree to be the candidate tree;
   repeating modifying, computing, selecting and designating for all remaining graphic assemblies.

5. The method of claim 4, wherein at least one of the set of graphic assemblies has more than one possible presentation, and wherein:
   modifying the candidate tree comprises modifying the candidate tree to form at least one alternate candidate tree by associating each possible presentation of a subsequent graphic assembly with at least one available location in the candidate tree; and
   computing scores comprises computing scores for each alternate candidate tree with the subsequent graphic assembly in each possible presentation in each available location on the candidate tree.

6. A method for arranging a set of graphic assemblies within an area, comprising:
   establishing at least one candidate tree having at least one internal node, and at least one terminal node emanating from an internal node, wherein each terminal node is associated with a presentation of a graphic assembly;
   determining a set of path lengths through each candidate tree;
   comparing a fixed distance term for each path length to a size of the area;
   discarding candidate trees where one or more of the fixed distance terms is greater than the size of the area;
   computing a score for each remaining candidate tree;
   selecting the candidate tree having a best score; and
   arranging the set of graphic assemblies within the area in accordance with the selected candidate tree.

7. The method of claim 6, wherein at least one of the graphic assemblies comprises a plurality of graphic elements.

8. The method of claim 6, wherein each of the graphic assemblies comprise one or more graphic elements, and wherein each graphic element is one of a fixed area graphic element and a variable-area graphic element.

9. The method of claim 8, further comprising determining an area for each variable-area graphic element before computing a score.

10. The method of claim 6, wherein determining a set of path lengths through each candidate tree comprises determining at least one horizontal path length and at least one vertical path length through each candidate tree.

11. The method of claim 10, wherein comparing a fixed distance term for each path length to a size of the area comprises comparing a fixed distance term for each horizontal path length to a width of the area, and comparing a fixed distance term for each vertical path length to a height of the area.

12. The method of claim 6, wherein determining a set of path lengths through each candidate tree comprises determining an exhaustive set of path lengths through each candidate tree.

13. The method of claim 6, wherein the fixed distance term for each path length includes a predetermined space between adjacent graphic assemblies.

14. The method of claim 6, wherein the fixed distance term for at least one path includes dimensions of graphic assemblies having a fixed area.

15. The method of claim 6, further comprising, prior to computing a score, determining an area for variable-area graphic elements within each graphic assembly.

16. The method of claim 15, wherein computing a score comprises summing areas of variable-area graphic elements, and wherein selecting the candidate tree having a best score comprises determining the candidate tree having the largest sum.

17. The method of claim 15, wherein computing a score comprises determining a fraction of the area occupied by graphic elements in the candidate tree.

18. The method of claim 15, wherein computing a score comprises assessing minimum and maximum values for graphic element sizes of graphic elements in the candidate tree, and determining the ratio of minimum graphic element size value divided by maximum graphic element size value.

19. The method of claim 6, further comprising modifying the selected candidate tree to form at least one alternate candidate tree.

20. The method of claim 19, wherein a subtree of the selected candidate tree comprises a location within the selected candidate tree and all internal and terminal nodes emanating from the location, and wherein modifying the selected candidate tree comprises:
   removing a subtree of the selected candidate tree associated with one location;
   inserting a new internal node into the selected candidate tree at said location;
   associating one of a horizontal division and a vertical division with the new internal node;
   inserting a new terminal node into the selected candidate tree emanating from the new internal node;
   associating the new terminal node with the subsequent graphic assembly; and
   inserting the subtree into the selected candidate tree, said subtree emanating from the new internal node.

21. The method of claim 20, wherein associating the new terminal node with the subsequent graphic assembly comprises associating the new terminal node with a first presentation of the subsequent graphic assembly.

22. The method of claim 21, wherein modifying the selected candidate tree further comprises associating the new terminal node with a subsequent presentation of the subsequent graphic assembly.

23. A non-transitory computer-readable medium having computer-executable instructions for performing a method for arranging a set of graphic assemblies in an area, the instructions comprising:
   establishing a candidate tree having at least one node and at least one leaf, wherein each node corresponds to a respective partition of the area, each leaf defines a relative position of a different respective one of the graphic assemblies in the area, and at least one of the graphic assemblies is a multi-element graphic assembly that comprises a respective group of multiple discrete graphic elements arranged in one of multiple possible relative positional arrangements within the area;
   determining if the candidate tree is a feasible candidate tree; and
   in response to a determination that the candidate tree is a feasible candidate tree, arranging the set of graphic assemblies within the area in accordance with the candidate tree.

24. The computer-readable medium of claim 23, wherein the computer-executable instructions for determining if the candidate tree is a feasible candidate tree comprises:
   generating a set of path lengths through the candidate tree; and
   verifying a fixed distance term for each path length fits within the area.

25. The computer-readable medium of claim 24, wherein the computer-executable instructions further comprise determining an area of each of the set of graphic assemblies.

26. A system for arranging a set of graphic assemblies within an area, comprising:
   means for establishing a candidate tree having at least one node and at least one leaf, wherein each node corresponds to a respective partition of the area, each leaf defines a relative position of a different respective one of the graphic assemblies in the area, and at least one of the graphic assemblies is a multi-element graphic assembly that comprises a respective group of multiple discrete graphic elements arranged in one of multiple possible relative positional arrangements within the area;
   means for determining if the candidate tree is a feasible candidate tree; and
   means for arranging the set of graphic assemblies within the area in accordance with the candidate tree, in response to a determination that the candidate tree is a feasible candidate tree.

27. The method of claim 1, wherein the establishing comprising inserting into a binary tree the multi-element graphic assembly with its respective group of graphic elements arranged in different ones of the possible relative positional arrangements to create respective candidate binary trees, and selecting one of the candidate binary trees as the candidate tree.

* * * * *